(12) United States Patent
Rubanovich et al.

(10) Patent No.: US 11,175,891 B2
(45) Date of Patent: Nov. 16, 2021

(54) SYSTEMS AND METHODS TO PERFORM FLOATING-POINT ADDITION WITH SELECTED ROUNDING

(71) Applicant: Intel Corporation, Santa Clara, CA (US)

(72) Inventors: Simon Rubanovich, Haifa (IL); Amit Gradstein, Binyamina (IL); Zeev Sperber, Zichron Yackov (IL); Mrinmay Dutta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 16/370,966

(22) Filed: Mar. 30, 2019

(65) Prior Publication Data
US 2020/0310756 A1  Oct. 1, 2020

(51) Int. Cl.
*G06F 7/499* (2006.01)
*G06F 7/483* (2006.01)
(Continued)

(52) U.S. Cl.
CPC .......... *G06F 7/49947* (2013.01); *G06F 7/483* (2013.01); *G06F 7/49915* (2013.01); *G06F 9/3822* (2013.01); *G06F 17/16* (2013.01)

(58) Field of Classification Search
CPC .. G06F 7/49947; G06F 7/49957; G06F 7/483; G06F 7/49915; G06F 7/3822;
(Continued)

(56) References Cited

U.S. PATENT DOCUMENTS 5,247,632 A   9/1993 Newman
5,475,822 A   12/1995 Sibigtroth et al.
(Continued)

FOREIGN PATENT DOCUMENTS

EP          1061436 A2    12/2000
KR   10-2011-0079495 A    7/2011
(Continued)

OTHER PUBLICATIONS

Corrected Notice of Allowability, U.S. Appl. No. 15/201,442, dated Jan. 22, 2019, 5 pages.
(Continued)

*Primary Examiner* — Michael D. Yaary
(74) *Attorney, Agent, or Firm* — Nicholson De Vos Webster & Elliott LLP

(57) ABSTRACT

Disclosed embodiments relate to performing floating-point addition with selected rounding. In one example, a processor includes circuitry to decode and execute an instruction specifying locations of first and second floating-point (FP) sources, and an opcode indicating the processor is to: bring the FP sources into alignment by shifting a mantissa of the smaller source FP operand to the right by a difference between their exponents, generating rounding controls based on any bits that escape; simultaneously generate a sum of the FP sources and of the FP sources plus one, the sums having a fuzzy-Jbit format having an additional Jbit into which a carry-out, if any, select one of the sums based on the rounding controls, and generate a result comprising a mantissa-wide number of most-significant bits of the selected sum, starting with the most significant non-zero Jbit.

20 Claims, 38 Drawing Sheets

(51) Int. Cl.
*G06F 9/38* (2018.01)
*G06F 17/16* (2006.01)

(58) Field of Classification Search
CPC ............... G06F 9/3001; G06F 9/30003; G06F 9/30007; G06F 9/30032; G06F 9/30036; G06F 9/30014; G06F 9/5443
USPC ......................................... 708/497, 424, 490
See application file for complete search history.

(56) References Cited

U.S. PATENT DOCUMENTS

| | | | |
|---|---|---|---|
| 5,892,962 | A | 4/1999 | Cloutier |
| 6,161,219 | A | 12/2000 | Ramkumar et al. |
| 6,212,112 | B1 | 4/2001 | Naura et al. |
| 6,332,186 | B1 | 12/2001 | Elwood et al. |
| 6,877,020 | B1 | 4/2005 | Bratt et al. |
| 7,003,542 | B2 | 2/2006 | Devir |
| 7,209,939 | B2 | 4/2007 | Castrapel et al. |
| 7,725,521 | B2 | 5/2010 | Chen et al. |
| 7,792,895 | B1 | 9/2010 | Juffa et al. |
| 7,873,812 | B1 | 1/2011 | Mimar |
| 7,912,889 | B1 | 3/2011 | Juffa et al. |
| 7,932,910 | B2 | 4/2011 | Hansen et al. |
| 8,392,487 | B1 | 3/2013 | Mesh et al. |
| 8,984,043 | B2 | 3/2015 | Ginzburg et al. |
| 9,442,723 | B2 | 9/2016 | Yang et al. |
| 9,906,359 | B2 | 2/2018 | Gueron |
| 9,960,907 | B2 | 5/2018 | Gueron |
| 10,535,114 | B2 | 1/2020 | Bolz |
| 2003/0126176 | A1 | 7/2003 | Devir |
| 2004/0111587 | A1 | 6/2004 | Nair et al. |
| 2005/0193050 | A1 | 9/2005 | Sazegari |
| 2006/0101242 | A1* | 5/2006 | Siu .................... G06F 9/30014 712/221 |
| 2006/0101245 | A1 | 5/2006 | Nair et al. |
| 2006/0190517 | A1 | 8/2006 | Guerrero |
| 2007/0186210 | A1 | 8/2007 | Hussain et al. |
| 2008/0071851 | A1 | 3/2008 | Zohar et al. |
| 2008/0140994 | A1 | 6/2008 | Khailany et al. |
| 2008/0208942 | A1 | 8/2008 | Won et al. |
| 2009/0043836 | A1 | 2/2009 | Dupaquis et al. |
| 2009/0292758 | A1 | 11/2009 | Brokenshire et al. |
| 2009/0300091 | A1 | 12/2009 | Brokenshire et al. |
| 2009/0300249 | A1 | 12/2009 | Moyer et al. |
| 2010/0180100 | A1 | 7/2010 | Lu et al. |
| 2010/0325187 | A1 | 12/2010 | Juffa et al. |
| 2012/0079252 | A1 | 3/2012 | Sprangle |
| 2012/0113133 | A1 | 5/2012 | Shpigelblat |
| 2012/0137074 | A1 | 5/2012 | Kim et al. |
| 2012/0254588 | A1 | 10/2012 | Adrian et al. |
| 2012/0314774 | A1 | 12/2012 | Yang et al. |
| 2013/0305020 | A1 | 11/2013 | Valentine et al. |
| 2014/0149480 | A1 | 5/2014 | Catanzaro et al. |
| 2015/0067302 | A1 | 3/2015 | Gueron |
| 2015/0199266 | A1 | 7/2015 | Franchetti et al. |
| 2016/0070536 | A1* | 3/2016 | Maeda ................ G06F 7/49947 708/497 |
| 2018/0113708 | A1 | 4/2018 | Corbal et al. |

FOREIGN PATENT DOCUMENTS

| | | |
|---|---|---|
| WO | 2004/053841 A2 | 6/2004 |
| WO | 2016/003740 A1 | 1/2016 |
| WO | 2016/105727 A1 | 6/2016 |
| WO | 2018/125250 A1 | 7/2018 |

OTHER PUBLICATIONS

Corrected Notice of Allowability, U.S. Appl. No. 15/201,442, dated Mar. 11, 2019, 2 pages.
International Preliminary Report on Patentability, PCT App. No. PCT/US2017/040546, dated Oct. 3, 2019, 10 pages.
International Search Report and Written Opinion, PCT App. No. PCT/US2017/040546, dated Jan. 24, 2018, 15 pages.
Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Non-Final Office Action, U.S. Appl. No. 15/201,442, dated May 4, 2018, 11 pages.
Non-Final Office Action, U.S. Appl. No. 16/398,200, dated Jul. 28, 2020, 17 pages.
Notice of Allowance, U.S. Appl. No. 15/201,442, dated Dec. 14, 2018, 5 pages.
European Search Report and Search Opinion, EP App. No. 20159827.3, dated Nov. 4, 2020, 10 pages.

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

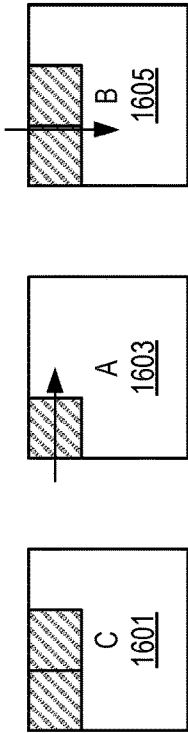

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| ▪ ▪ ▪ | |
| TMM15 ROWS | TMM15 COLUMNS |
| 0 | |

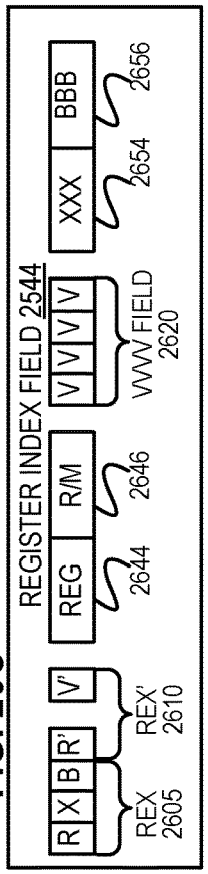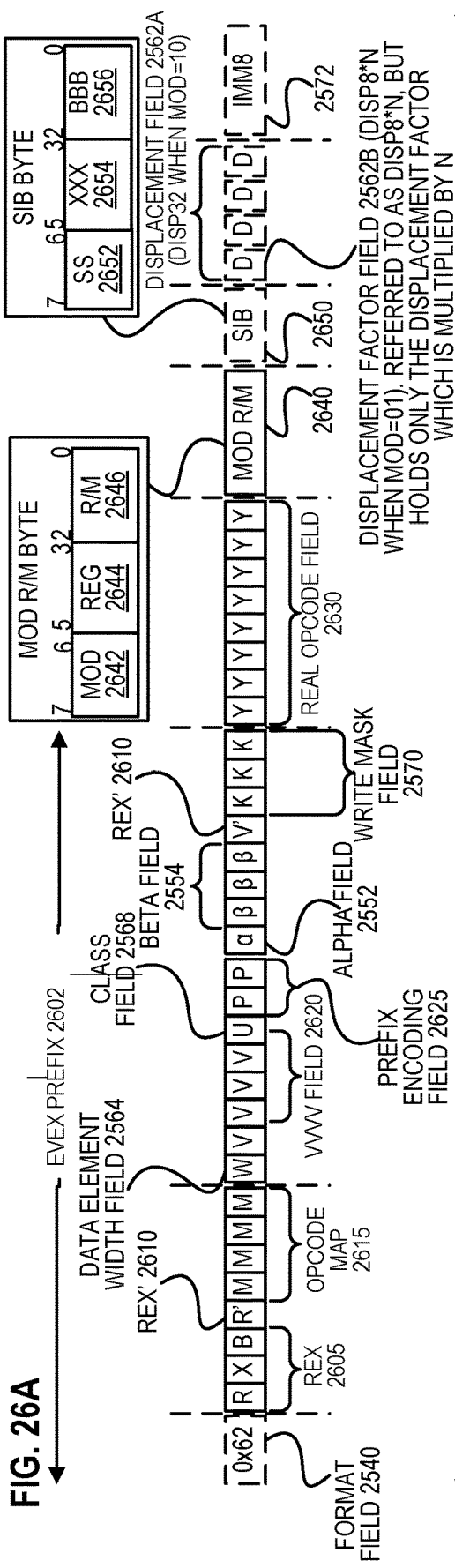
FIG. 26A
FIG. 26B
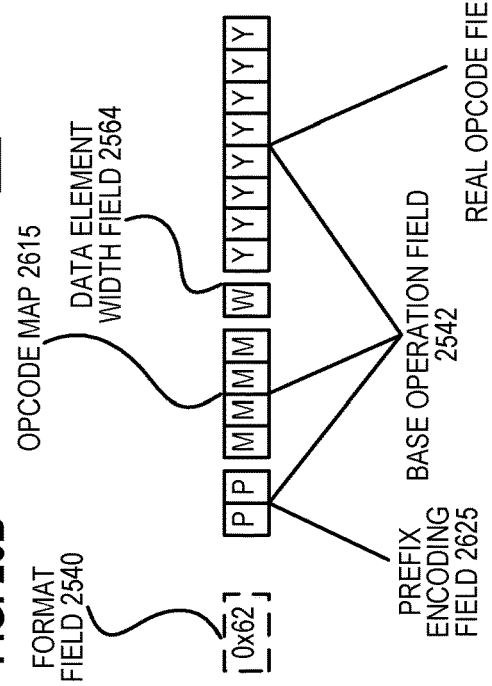
FIG. 26C

FIG. 27
REGISTER ARCHITECTURE 2700
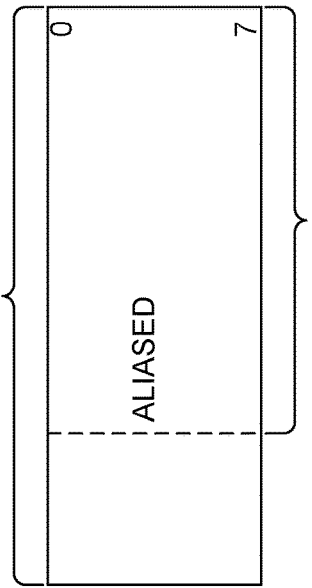
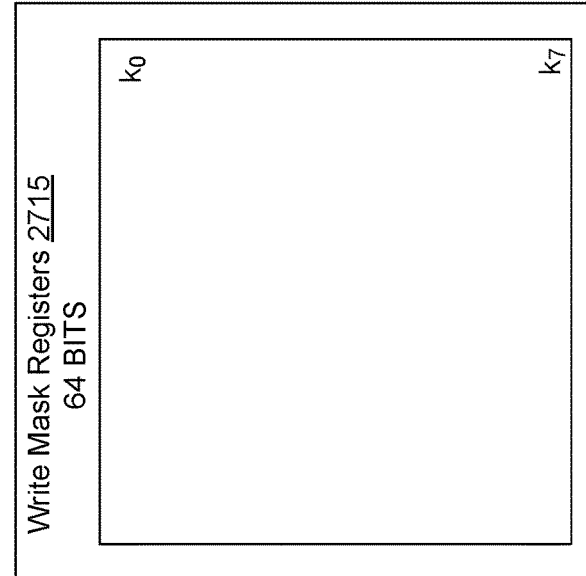
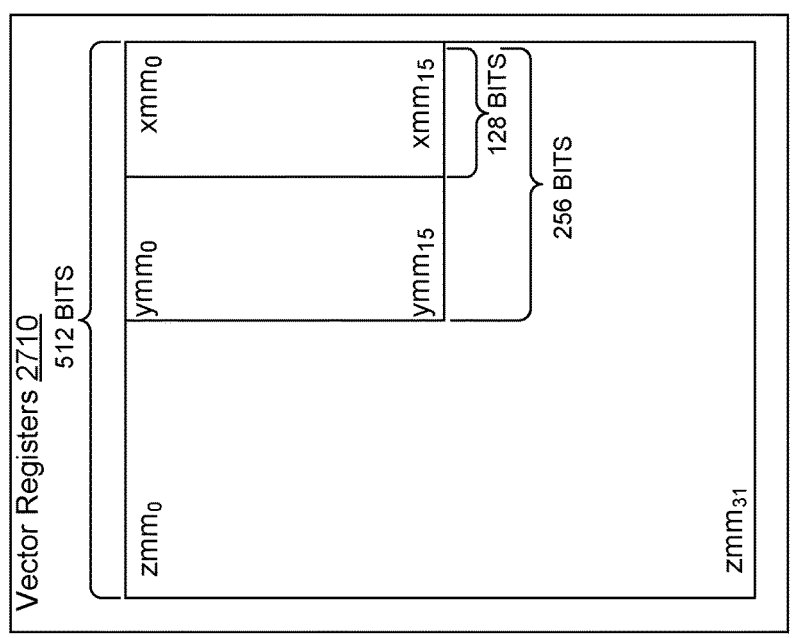

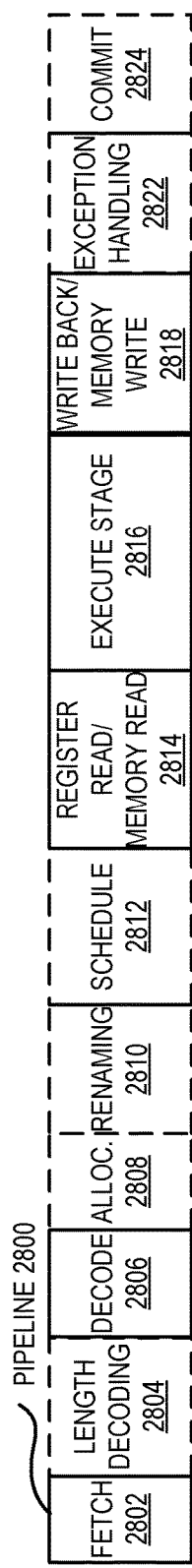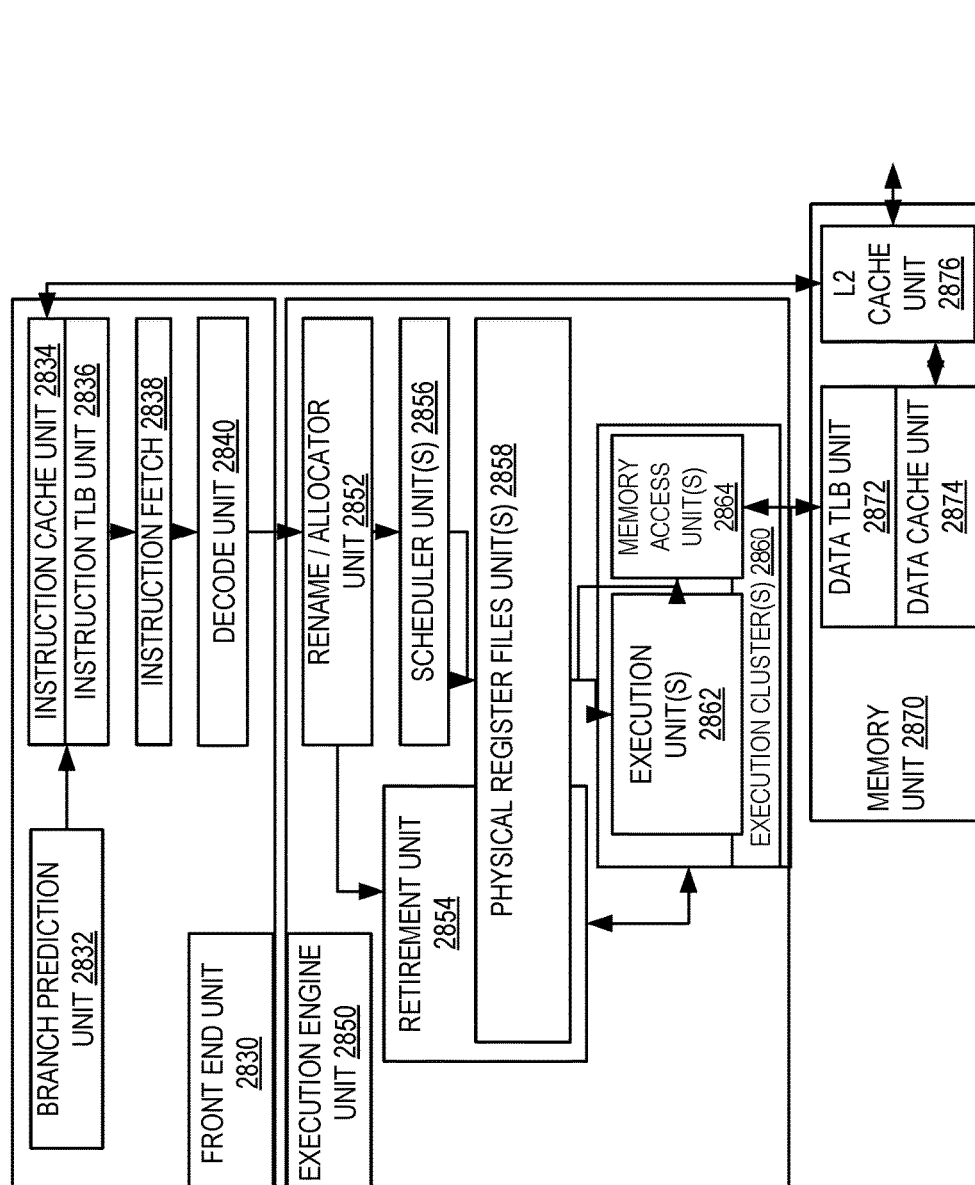

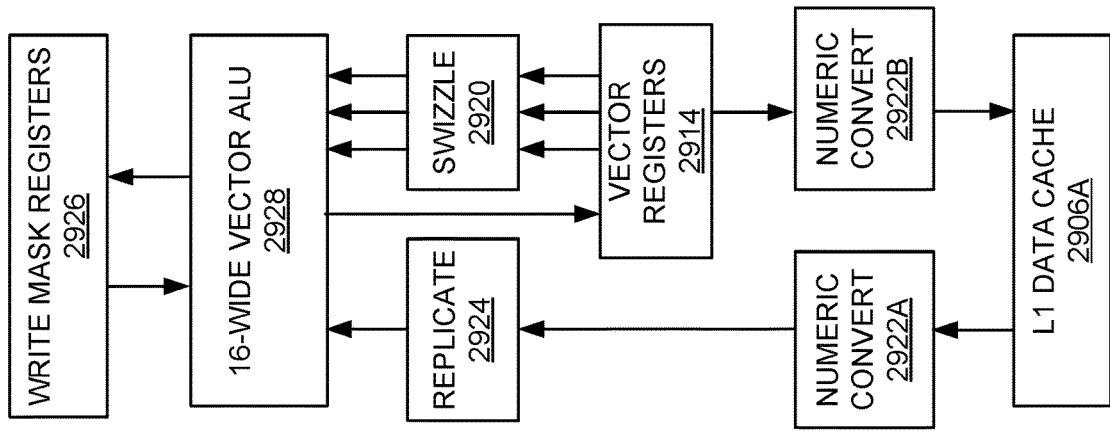
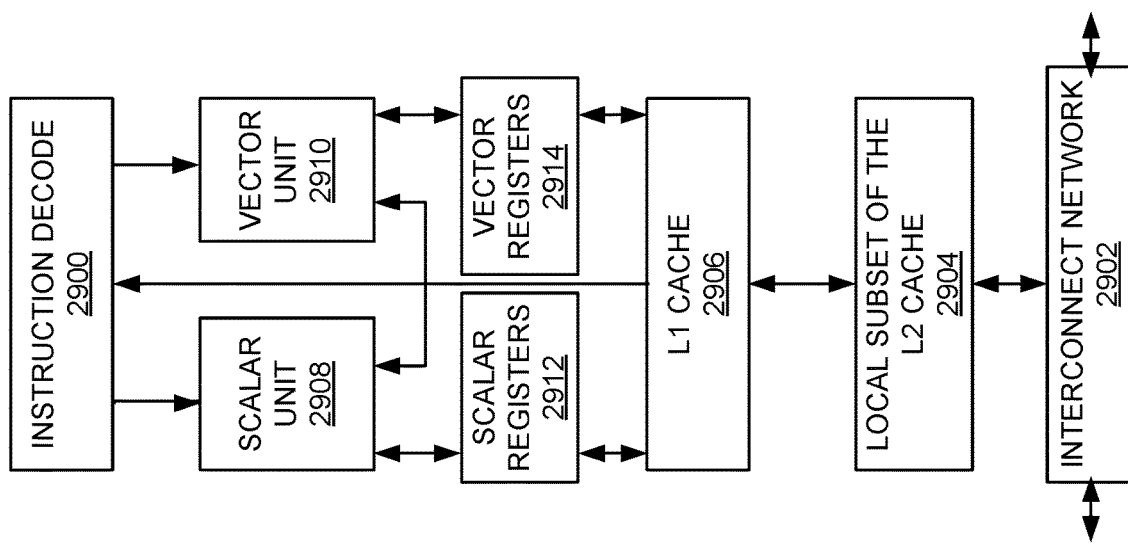

SYSTEMS AND METHODS TO PERFORM FLOATING-POINT ADDITION WITH SELECTED ROUNDING

FIELD OF INVENTION

The field of invention relates generally to computer processor architecture, and, more specifically, to systems and methods to perform floating-point addition with selected rounding.

BACKGROUND

Matrices are increasingly important in many computing tasks such as machine learning and other bulk data processing. Deep Learning is a class of machine learning algorithms. Deep learning architectures, such as deep neural networks, have been applied to fields including computer vision, speech recognition, natural language processing, audio recognition, social network filtering, machine translation, bioinformatics and drug design.

Inference and training, two tools used for deep learning, are tending towards low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a common compute-heavy operation on today's processors. Special hardware for matrix multiplication (e.g., GEMM) is a good option for improving the peak compute (and energy efficiency) of certain applications, such as deep learning.

Floating-point addition and floating-point multiply-accumulate instructions are commonly used in deep-learning contexts. Improving the power and performance of such instructions can serve to improve the power and performance of processor hardware in a machine learning context. Reducing the impact of rounding on the latency of executing a floating-point arithmetic operation is one way to improve the performance and reduce the power consumption of such instructions.

BRIEF DESCRIPTION OF THE DRAWINGS

The present invention is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;
FIG. 15 illustrates an example of a matrix expressed in row major format and column major format;
FIG. 16 illustrates an example of usage of matrices (tiles);
FIG. 19 illustrates an embodiment of a description of the matrices (tiles) to be supported;
FIGS. 21A-C illustrate floating-point formats, according to some embodiments;
FIG. 22C illustrates floating-point values used in an exemplary execution of a floating-point addition (FPADD) instruction, according to some embodiments;
FIG. 22D illustrates floating-point values used in an exemplary execution of a floating-point addition (FPADD) instruction, according to some embodiments;
FIG. 25A is a block diagram illustrating a generic vector friendly instruction format and class A instruction templates thereof according to embodiments;
FIG. 25B is a block diagram illustrating the generic vector friendly instruction format and class B instruction templates thereof according to embodiments;
FIG. 26A is a block diagram illustrating an exemplary specific vector friendly instruction format according to embodiments;
FIG. 26B is a block diagram illustrating the fields of the specific vector friendly instruction format that make up the full opcode field according to one embodiment;
FIG. 26C is a block diagram illustrating the fields of the specific vector friendly instruction format that make up the register index field according to one embodiment;
FIG. 27 is a block diagram of a register architecture according to one embodiment;

FIG. 28A is a block diagram illustrating both an exemplary in-order pipeline and an exemplary register renaming, out-of-order issue/execution pipeline according to embodiments;

FIG. 28B is a block diagram illustrating both an exemplary embodiment of an in-order architecture core and an exemplary register renaming, out-of-order issue/execution architecture core to be included in a processor according to embodiments;

FIGS. 29A-B illustrate a block diagram of a more specific exemplary in-order core architecture, which core would be one of several logic blocks (including other cores of the same type and/or different types) in a chip;

FIG. 29A is a block diagram of a single processor core, along with its connection to the on-die interconnect network and with its local subset of the Level 2 (L2) cache, according to embodiments;

FIG. 29B is an expanded view of part of the processor core in FIG. 29A according to embodiments;

FIG. 31 shown a block diagram of a system in accordance with one embodiment of the present invention;

FIG. 32 is a block diagram of a first more specific exemplary system in accordance with an embodiment of the present invention;

FIG. 33 is a block diagram of a second more specific exemplary system in accordance with an embodiment of the present invention;

FIG. 34 is a block diagram of a System-on-a-Chip (SoC) in accordance with an embodiment of the present invention.

DETAILED DESCRIPTION

Figure 1A:
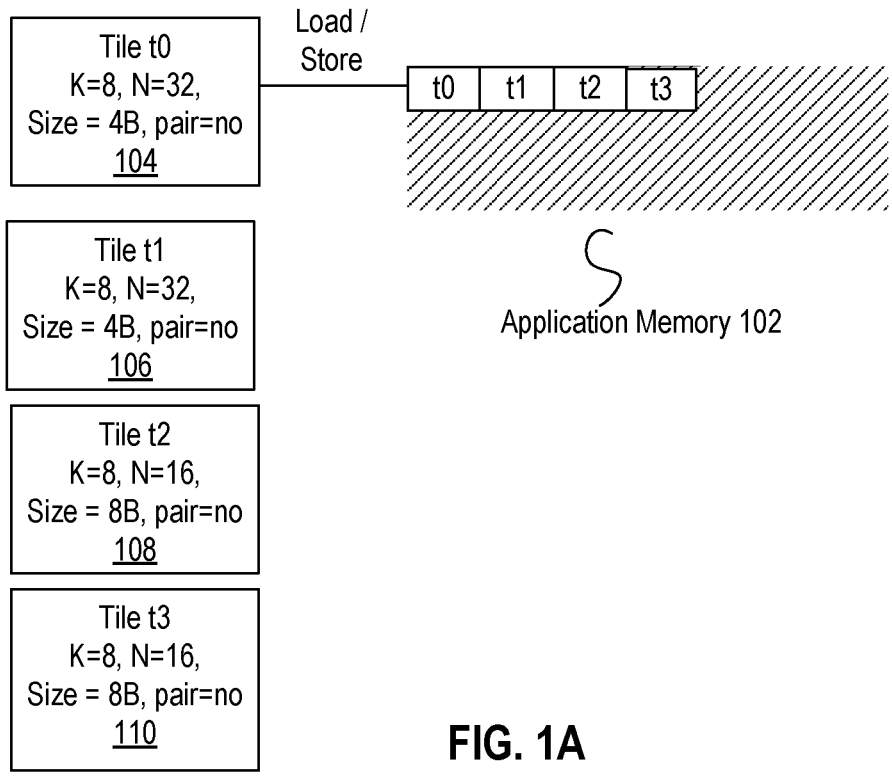
FIG. 1A illustrates an embodiment of configured tiles.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc. Also described herein are instructions for performing reduced-latency floating-point addition (FPADD) instructions.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and whether the tile consists of a PAIR of equal-sized tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
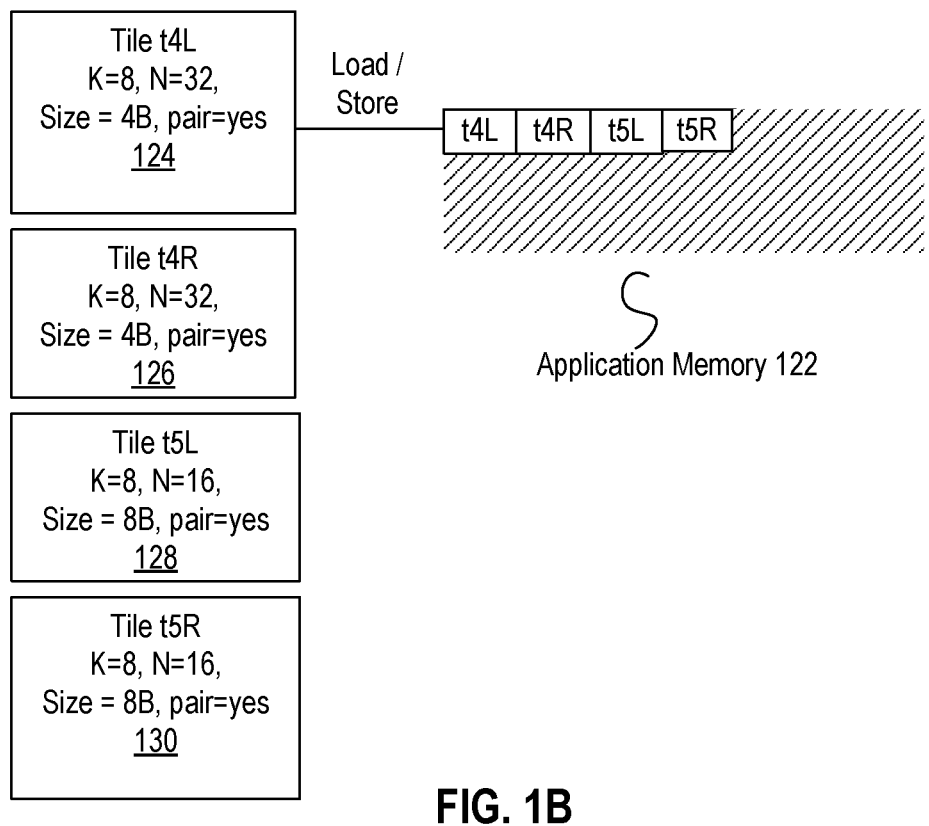
FIG. 1B illustrates an embodiment of configured tiles.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating point data), where K equals 8 and N equals 32. Tile t5L 128 and tile t5R 130 have K rows and N/2 columns of 8-byte elements (e.g., double precision floating point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Figure 2:
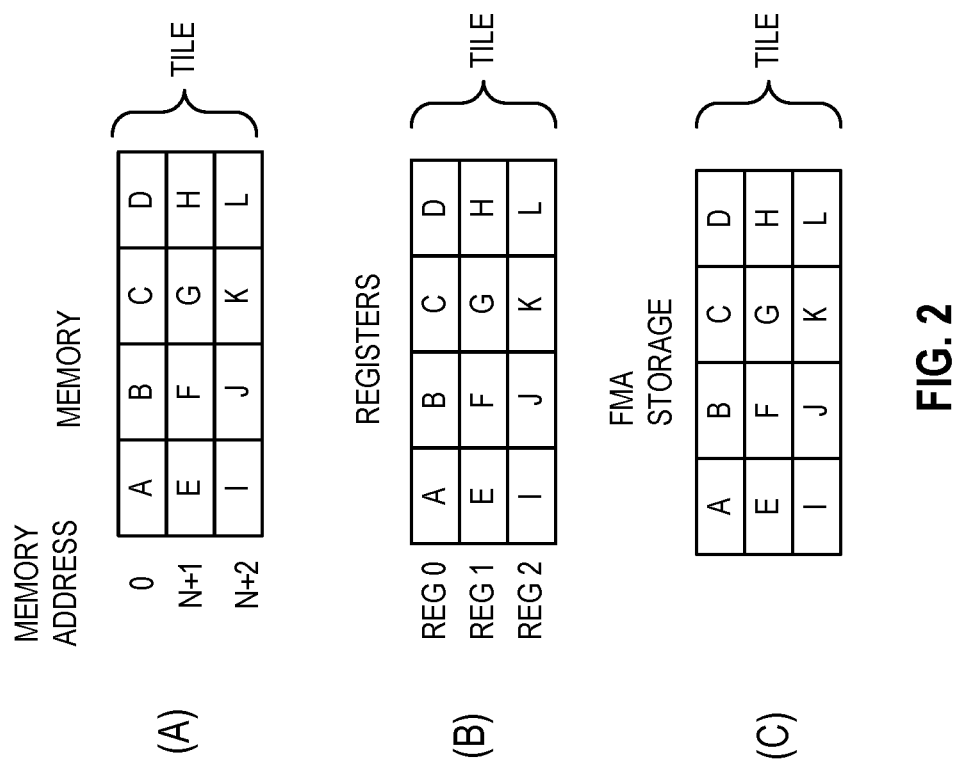
FIG. 2 illustrates several examples of matrix storage.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.
Exemplary Tile Storage Types FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of an FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

Matrix (Tile) Operation Systems

Exemplary Hardware Support

Figure 3:
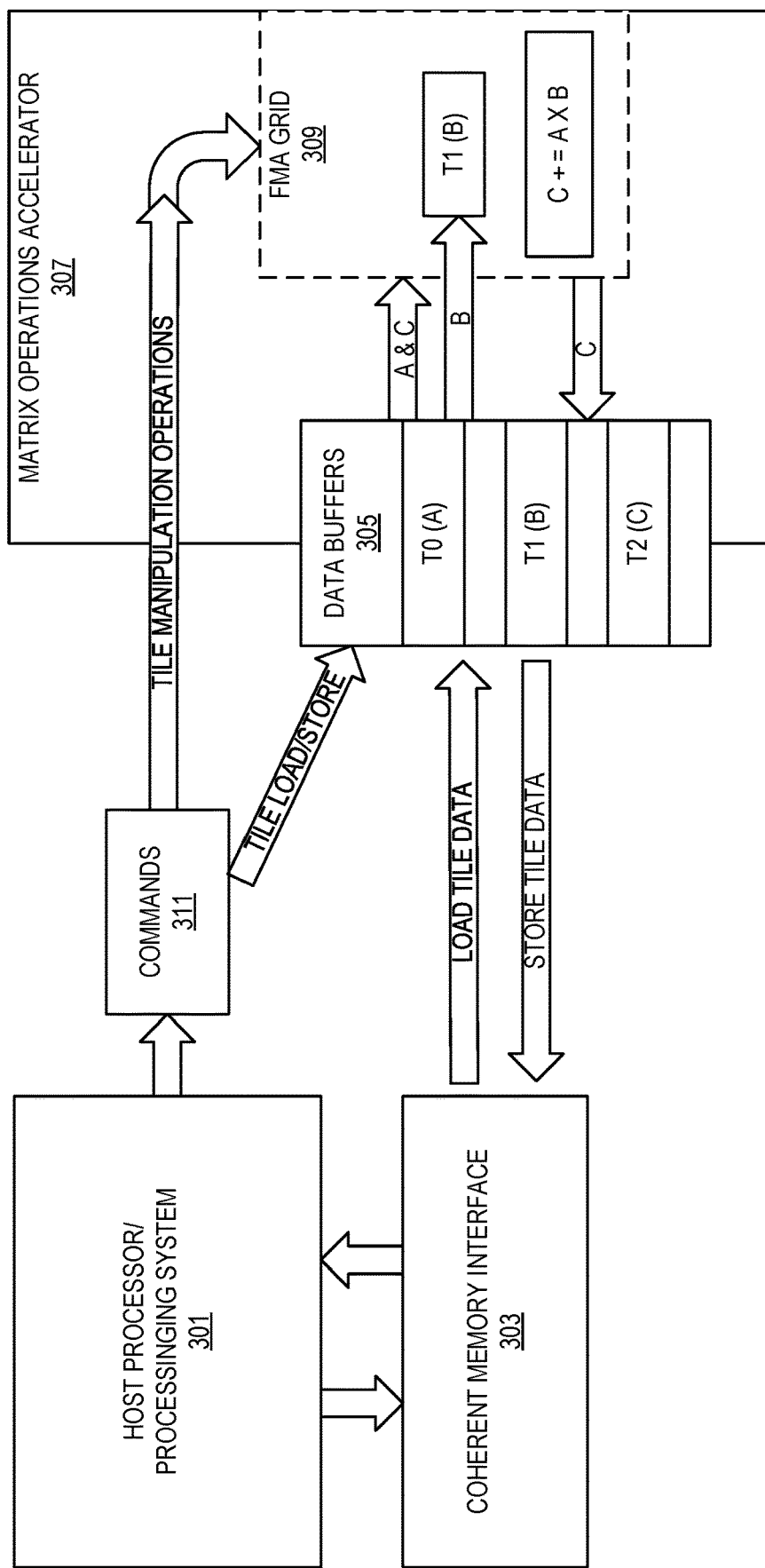
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
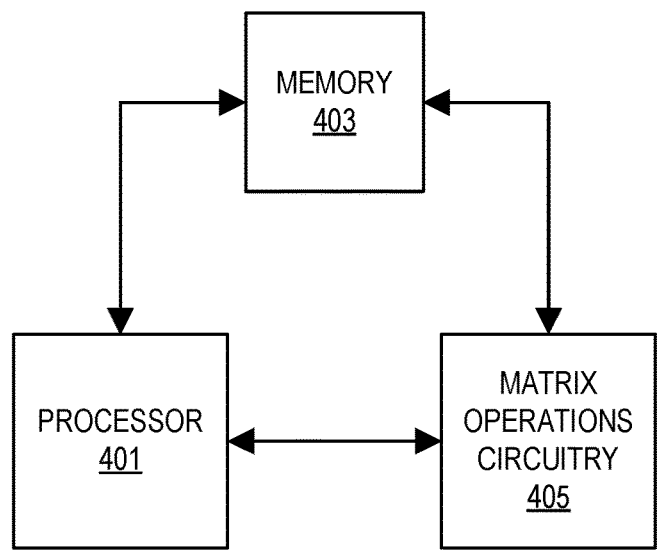
FIGS. 4 and 5 show different embodiments of how memory is shared using a matrix operations accelerator.
Figure 5:
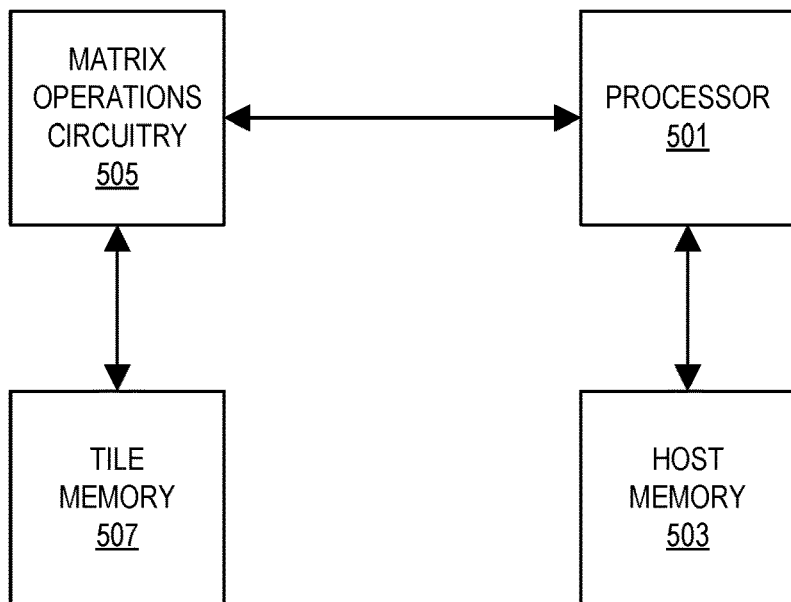

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
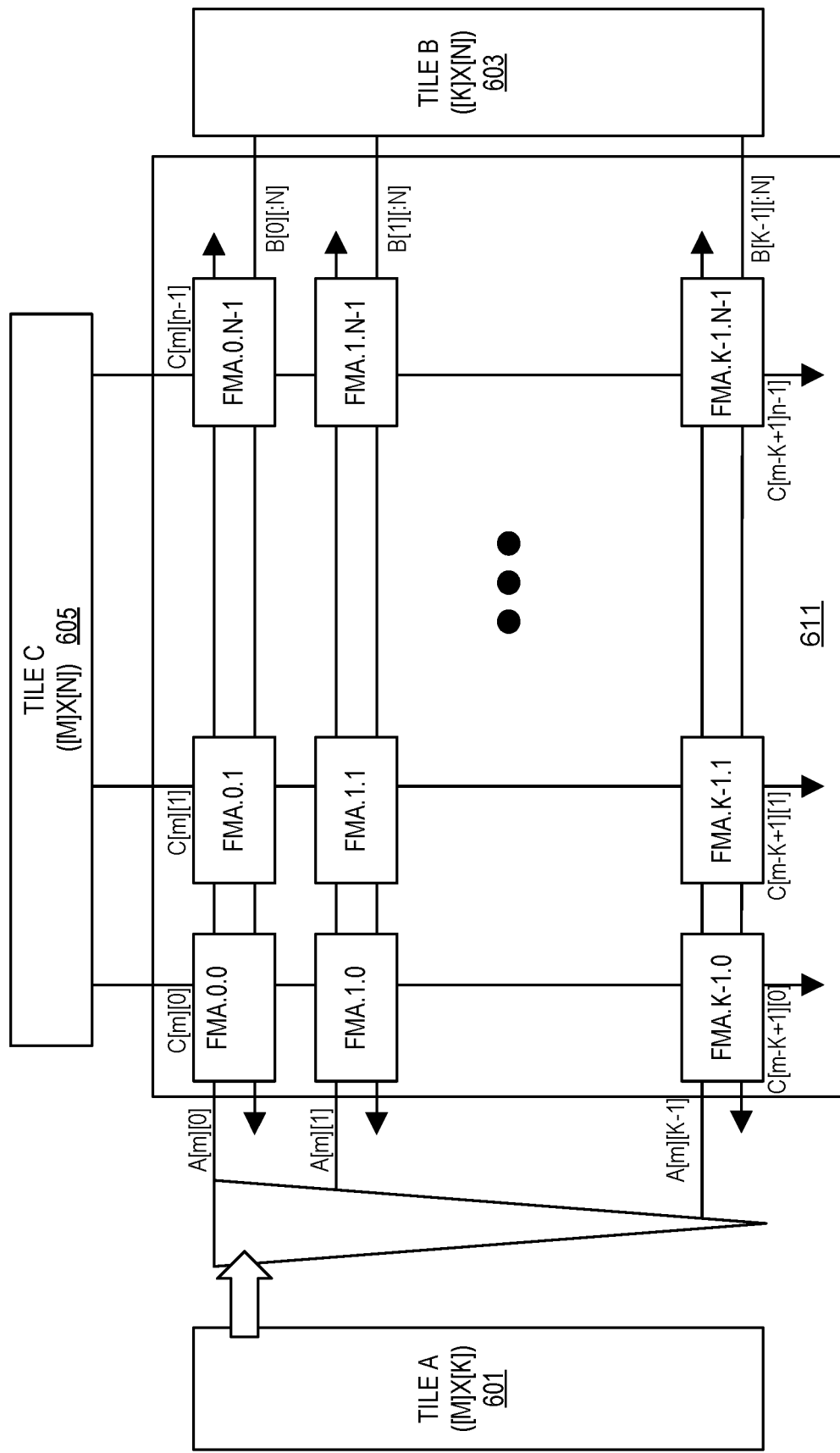
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
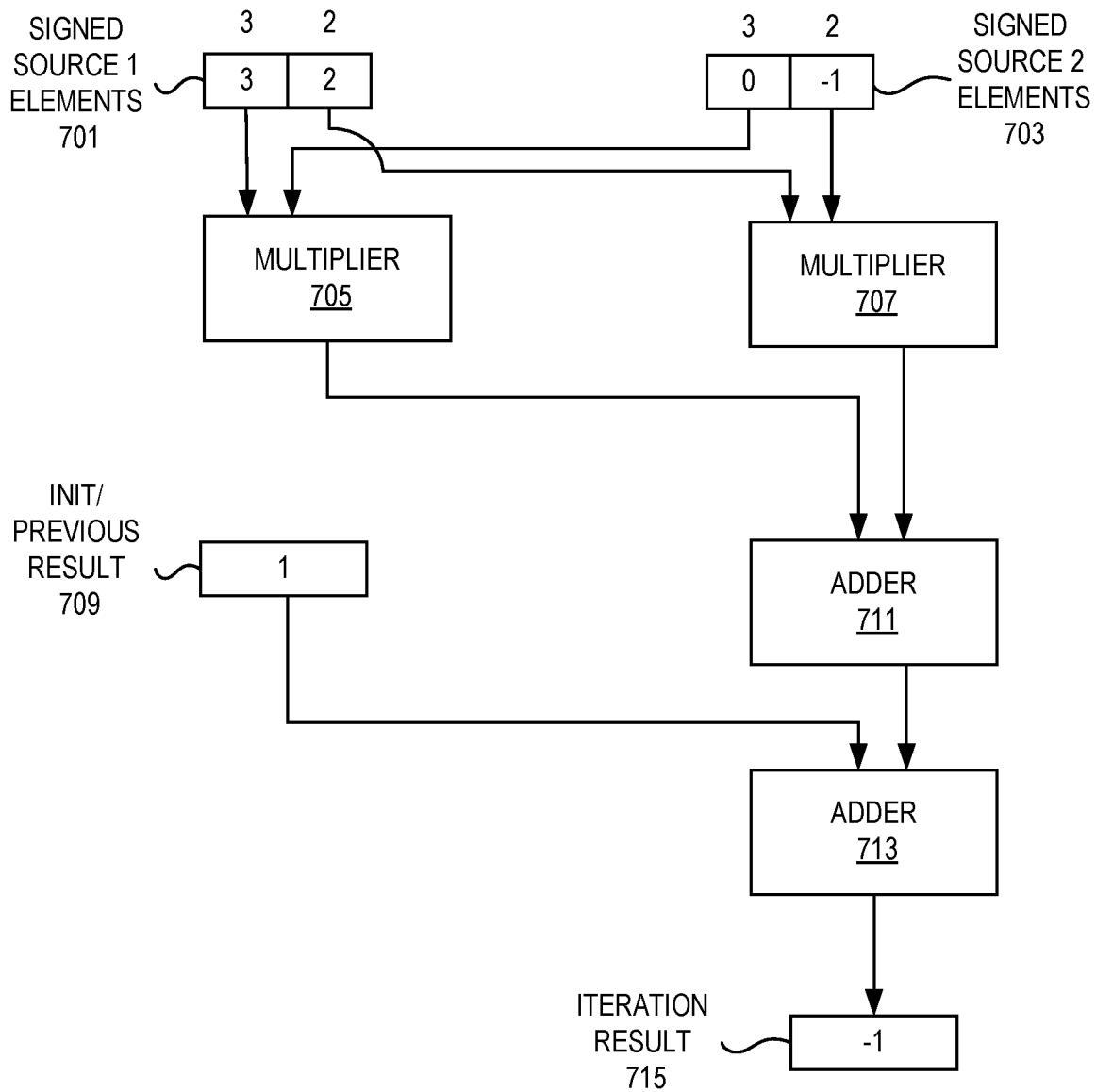
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
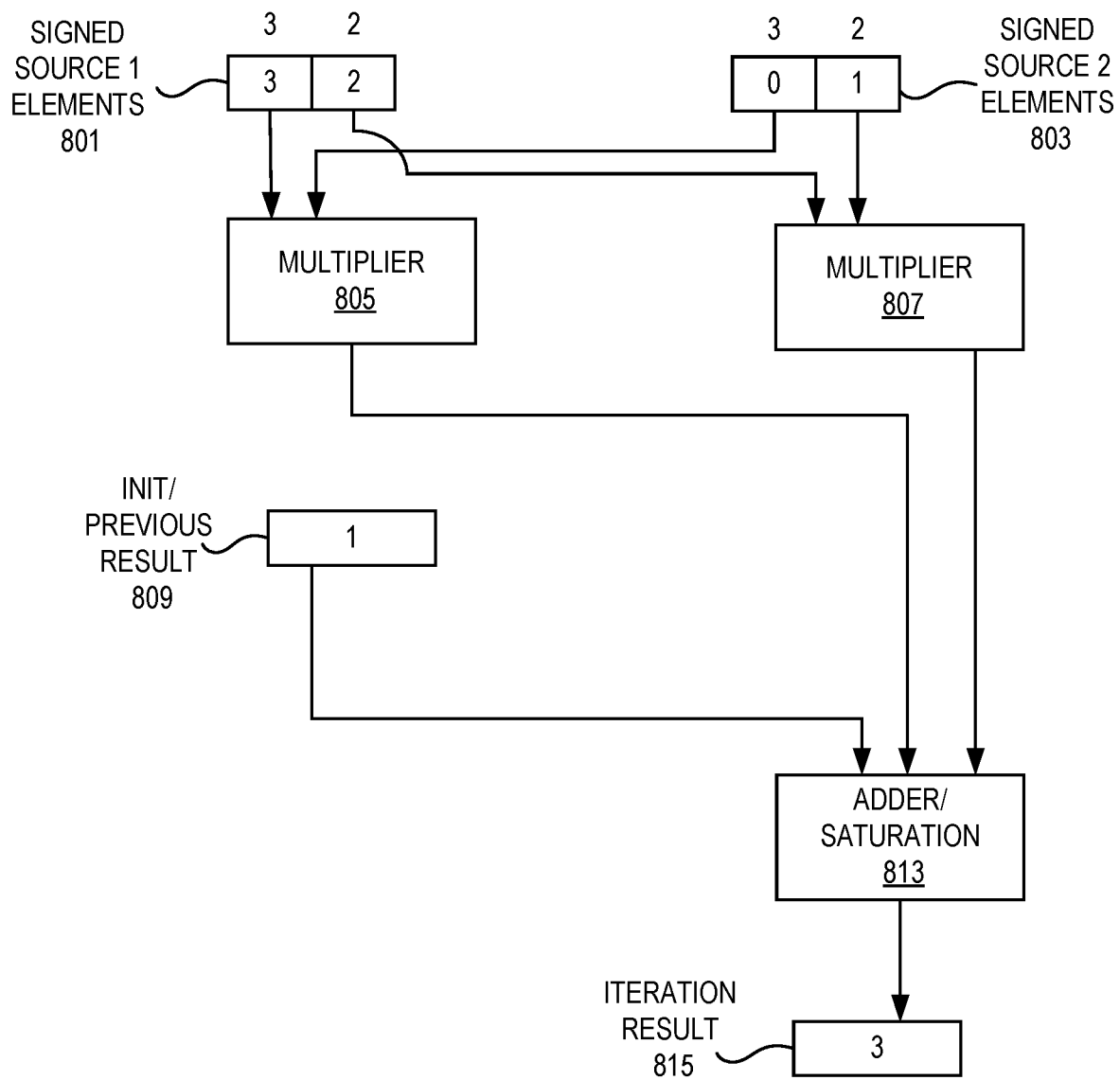
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−$2^7$) to 127(=$2^7$−1)).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
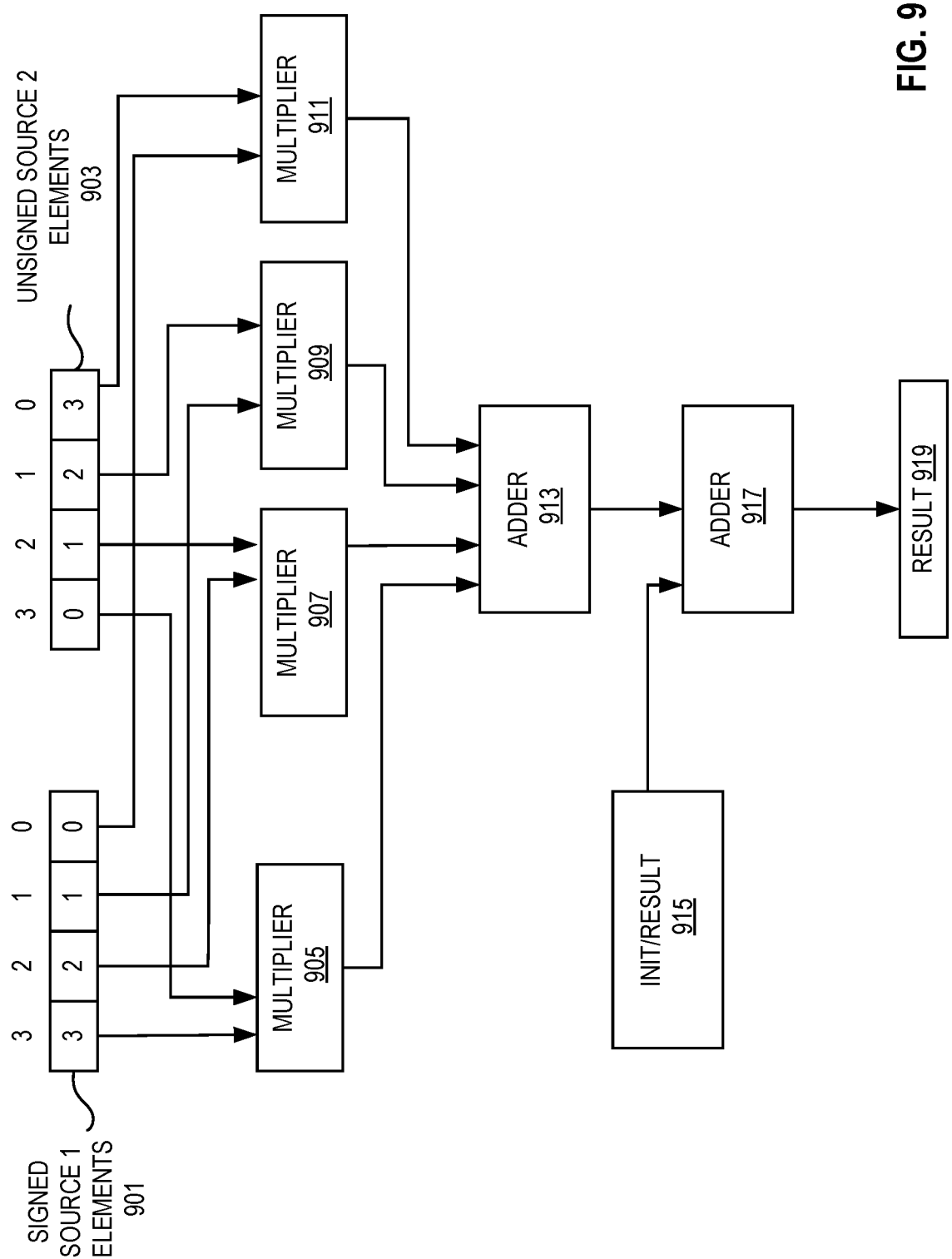
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
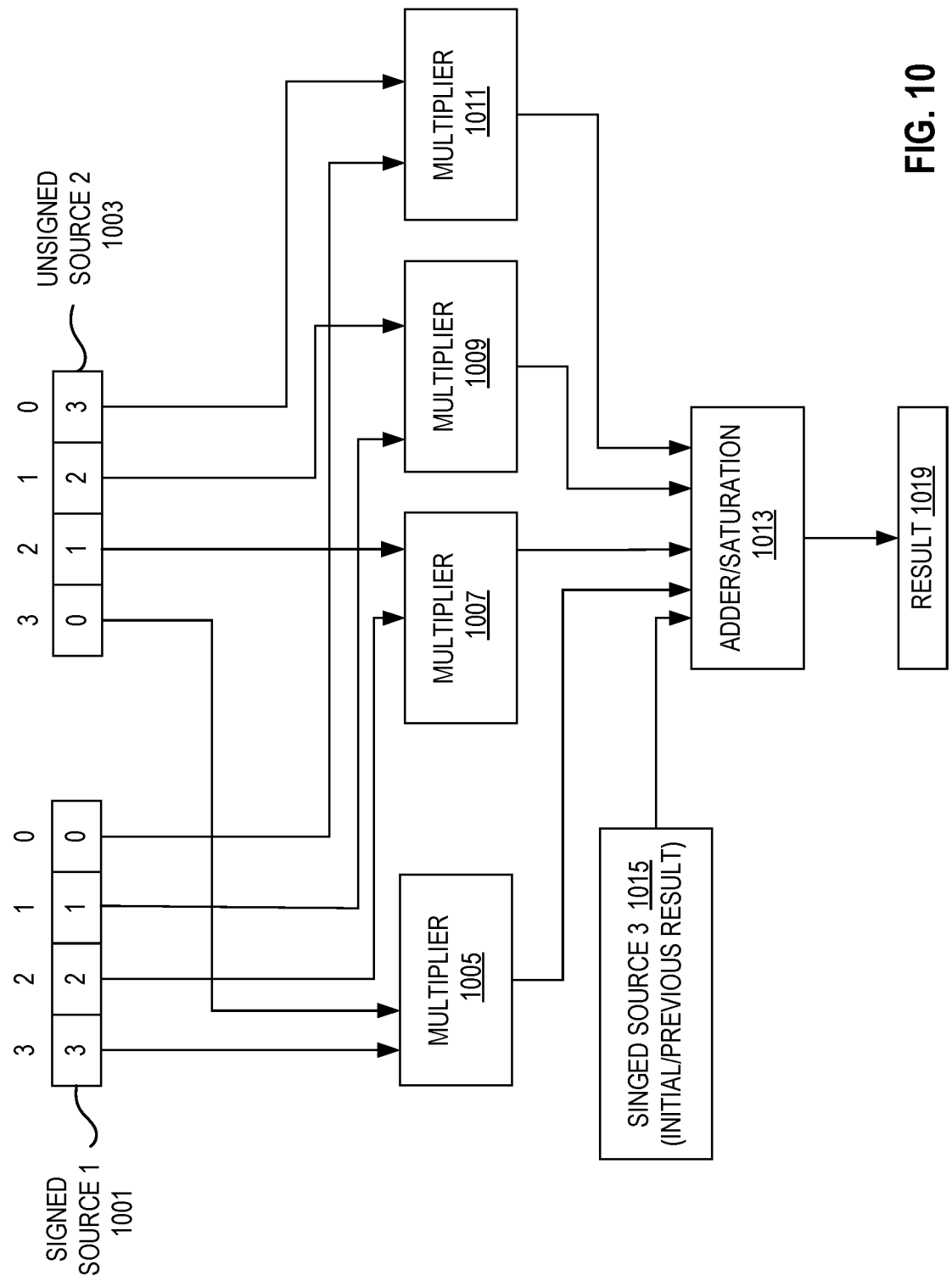
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
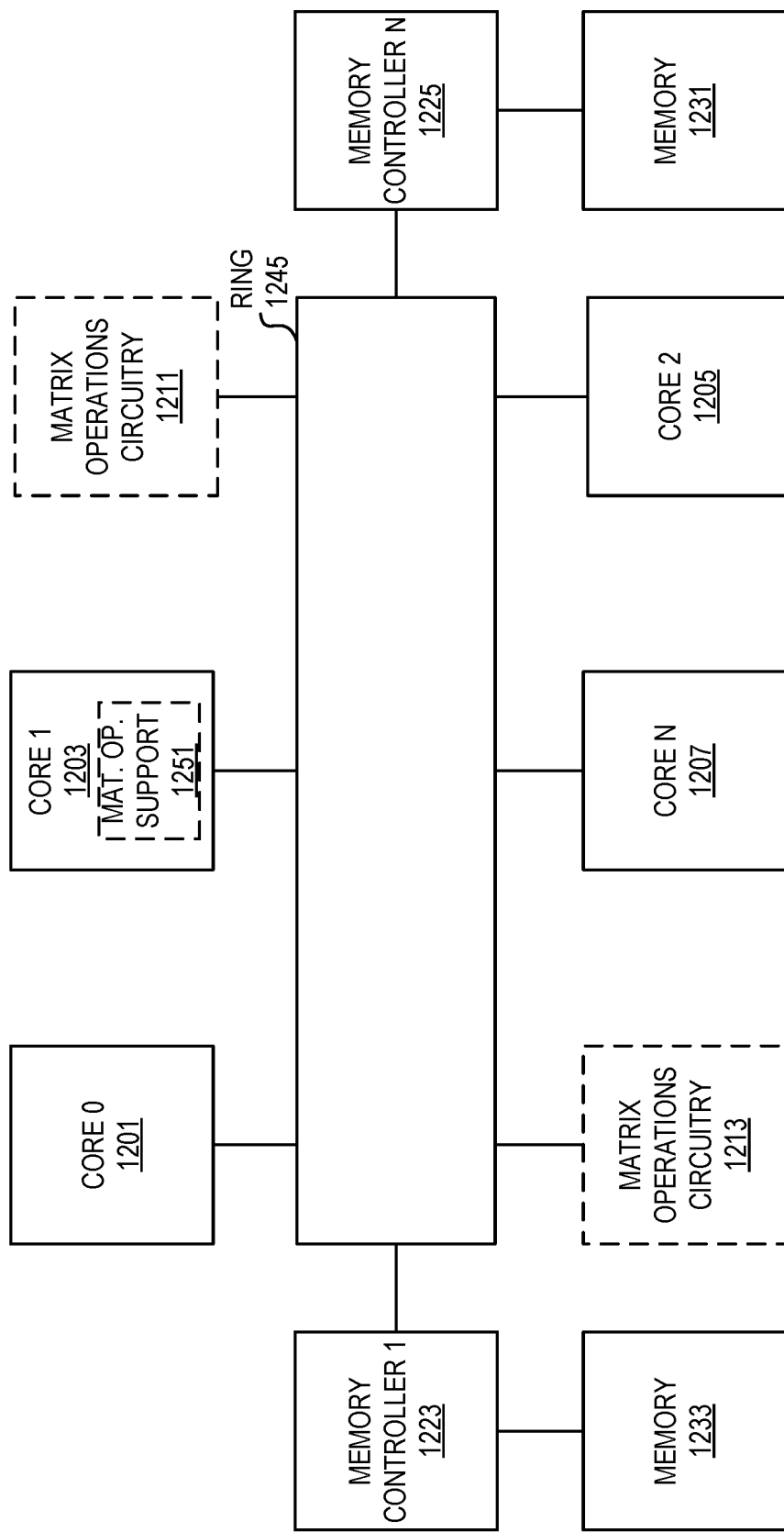
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
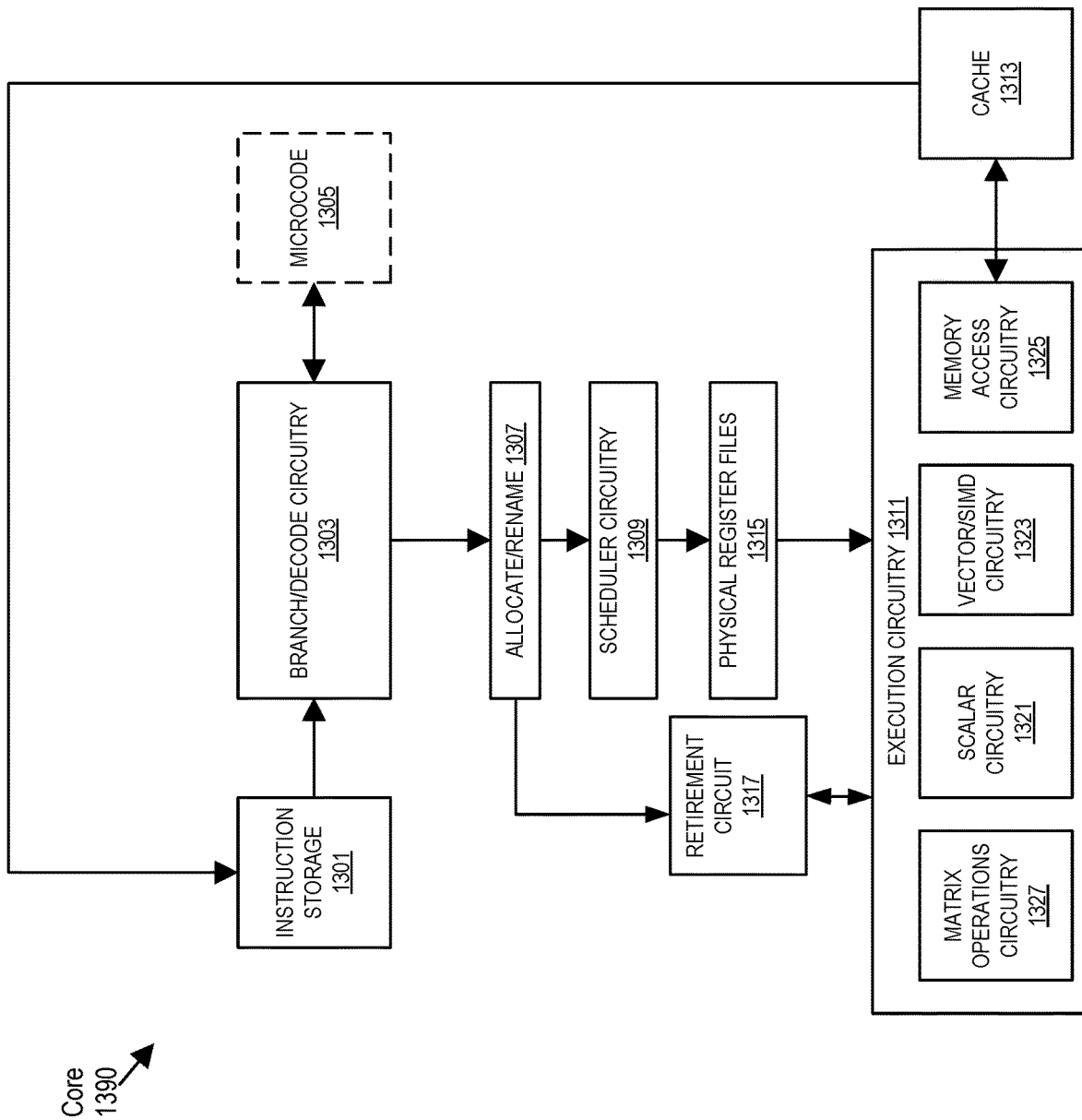
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
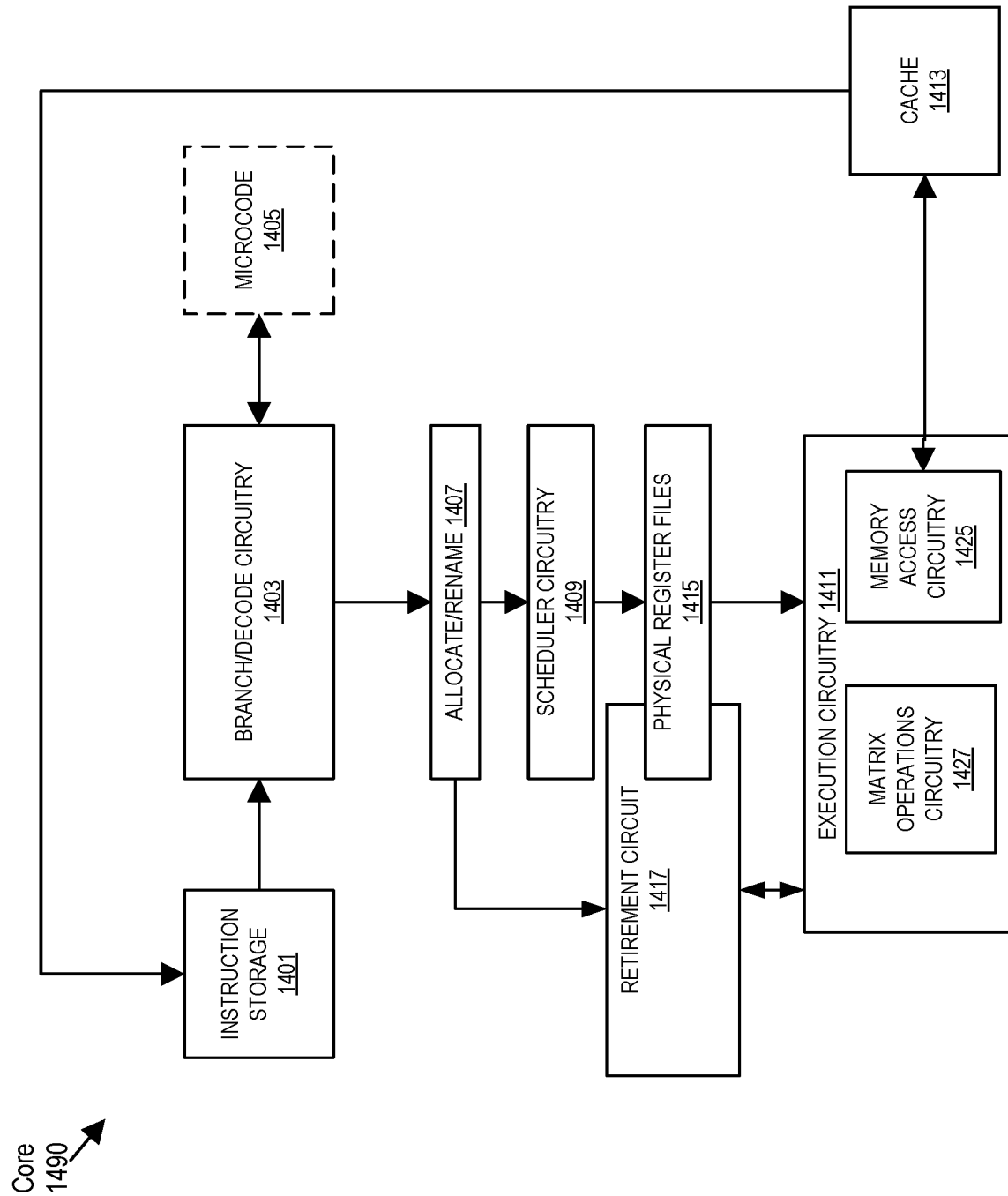
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformed matrix.

For example, if there are two column-major matrices to multiply:

$$\begin{matrix} ab \\ cd^* \\ ef \end{matrix} \quad \begin{matrix} gik \\ hjl \end{matrix} = \begin{matrix} ag+bh & ai+bj & ak+bl \\ cg+dh & ci+dj & ck+dl \\ eg+fh & ei+fj & ek+fl \end{matrix}$$

$$(3 \times 2) \quad (2 \times 3) \quad (3 \times 3)$$

The input matrices would be stored in linear memory (column-major) as:

a c e b d f and g h i j k l.

Reading those matrices as row-major with dimensions 2×3 and 3×2, they would appear as:

$$\begin{matrix} ace \\ bdf \end{matrix} \quad \text{and} \quad \begin{matrix} gh \\ ij \\ kl \end{matrix}$$

Swapping the order and matrix multiplying:

$$\begin{matrix} gh \\ ij \\ kl \end{matrix} \quad * \quad \begin{matrix} ace \\ bdf \end{matrix} = \begin{matrix} ag+bh & cg+dh & eg+fh \\ ai+bj & ci+dj & ei+fj \\ ak+bl & ck+dl & ek+fl \end{matrix}$$

The transform matrix is out and can then be stored in in row-major order:

$$\begin{matrix} ag+bh & cg+dh \\ eg+fh & ai+bj & ci+dj & ei+fj & ak+bl & ck+dl & ek+fl \end{matrix}$$

and used in subsequent column major computations, it is the correct un-transformed matrix:

$$\begin{matrix} ag+bh & ai+bj & ak+bl \\ cg+dh & ci+dj & ck+dl \\ eg+fh & ei+fj & ek+fl \end{matrix}$$

Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is reused twice as it multiplied by two tiles from matrix B 1605. Pointers to load a new A matrix (tile) and two new B matrices (tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
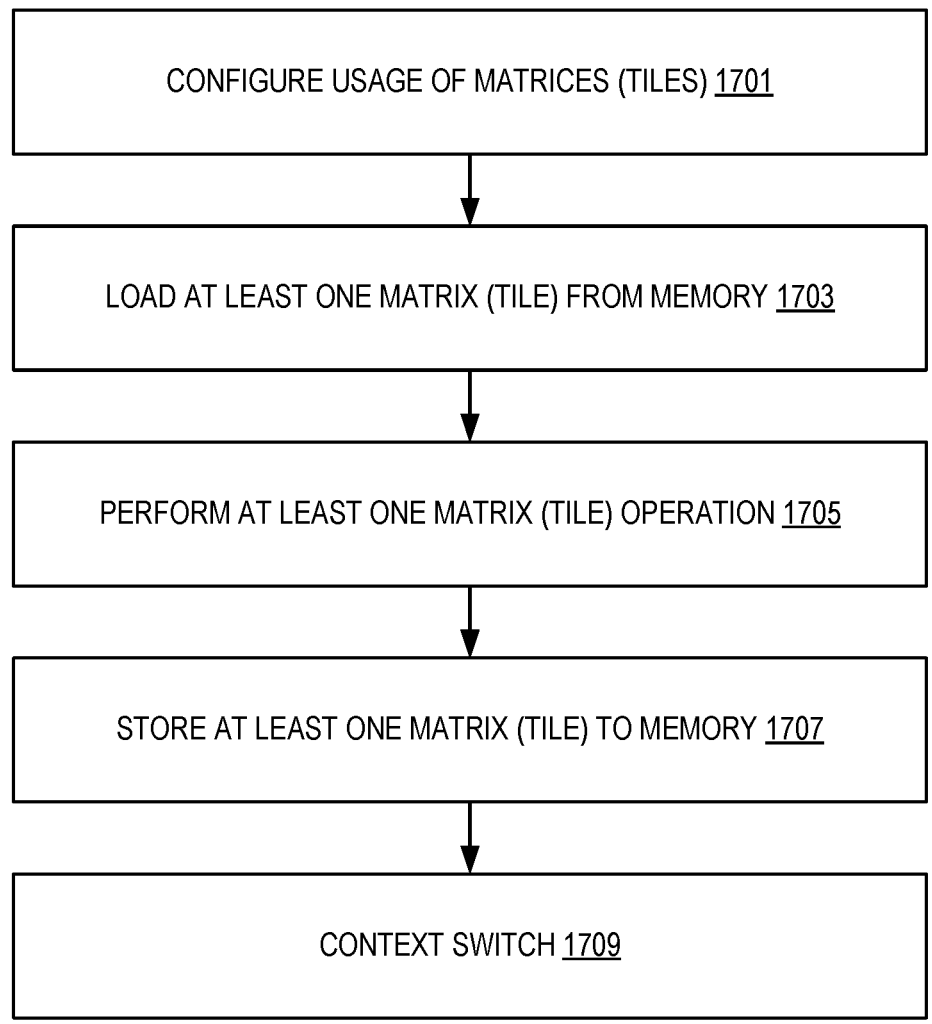
FIG. 17 illustrates an embodiment a method of usage of matrices (tiles)

FIG. 17 illustrates an embodiment of usage of matrices (tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

Tile Usage Configuration

Figure 18:
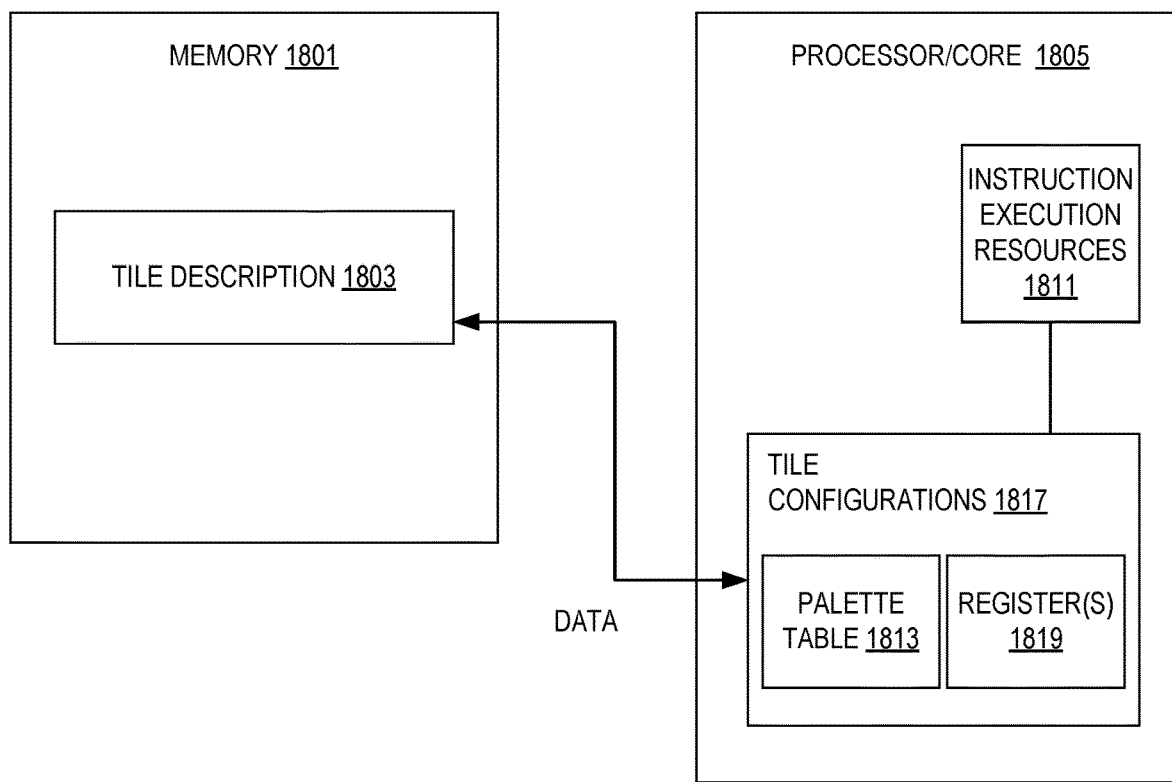
FIG. 18 illustrates support for configuration of the usage of tiles according to an embodiment.

FIG. 18 illustrates support for configuration of the usage of tiles according to an embodiment. A memory 1801 contains the tile description 1803 of the matrices (tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked floating point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

Exemplary Tile and Tile Configuration Storage

Figure 20A:
FIGS. 20(A)-(D) illustrate examples of register(s)

FIGS. 20(A)-(D) illustrate examples of register(s) 1819. FIG. 20(A) illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
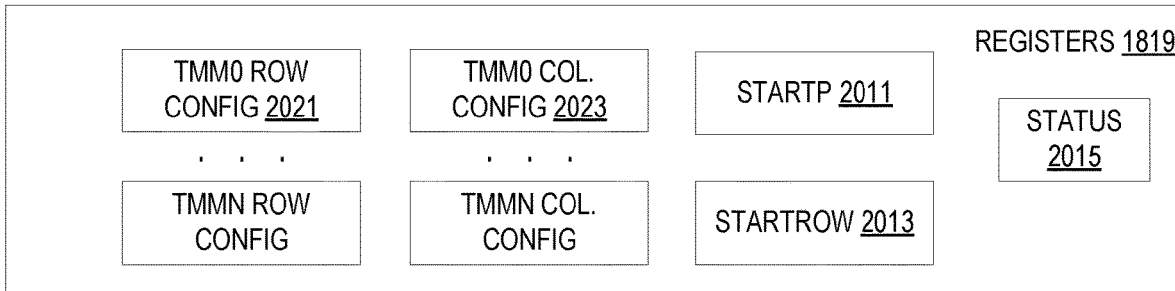

FIG. 20(B) illustrates a plurality of registers 1819. As shown each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:

FIG. 20(C) illustrates a single register 1819. As shown, this register stores tile configurations (rows and columns per tile) 2031, StartP 2011, and StartRow 2013 are stored in a single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

FPADD

As mentioned above, Floating-point addition and floating-point multiply-accumulate instructions are commonly used in deep-learning contexts. Improving the power and performance of such instructions can serve to improve the power and performance of processor hardware in a machine learning context. Reducing the impact of rounding on the latency of executing a floating-point arithmetic operation is one way to improve the performance and reduce the power consumption of such instructions.

Reducing Impact of Serialized Rounding on Latency

Parallel Rounding: Some disclosed embodiments remove the serialized latency associated with rounding from the critical timing path of floating-point addition. Rather than to first perform the addition and then serially perform rounding, disclosed embodiments generate two results in parallel and then select one according to prepared rounding parameters. In other words, rounding a floating-point result calls for conditionally adding one (1) to the result, depending on rounding controls. Disclosed embodiments generate two sums, one of which adds 1, and then select one of the two based on rounding controls.

No Rounding:

according to some embodiments, which are particularly useful in a matrix (tile) multiplication context, rounding is eliminated from an FMA operation. Instead, when performing an FMA operation, the execution circuitry is just to determine whether the result should be rounded by adding a '1.' If so, a '1' is added to an immediately subsequent FMA operation that is to accumulate its result with the result of the first FMA. In other words, just the rounding control is determined during an FMA operation and is transferred to the next addition in order to use it in its calculations. For example, in the context of some disclosed matrix multiplication embodiments, the processor is to perform multiple calculations (e.g., 8, 16, 32, or 64), each one accumulating its result with an immediately preceding FMA. The result of the last FMA in the sequence is to actually be rounded. Embodiments that eliminate rounding as described advantageously gain performance and reduce hardware and power utilization.

Alternative, inferior approaches to performing floating-point addition and rounding perform the rounding serially, after performing the addition. Such approaches suffer from incurring the additional latency of both the rounding and the addition, which, depending on the processor technology, may not meet timing requirements.

Disclosed embodiments, in contrast, utilize two concurrently-operating paths of calculation in a floating-point adder: alignment path and normalization path. The first path, the normalization pipeline, focuses on normalization of operand mantissas, and provides left-shift capability to do so. While some alternative approaches include rounding on the normalization path, disclosed embodiments advantageously obviate the need to do so, as described below. The normalization path is used when the FPADD operation calls for subtracting operands whose exponents differ by 0 or 1. The second path, the alignment pipeline, provides an arbitrary right-shift capability to align the operands for addition or for subtraction where the exponents differ by more than one. The alignment path is taken according to the following properties: 1) the exponents of two terms are not equal, and 2) after alignment, a maximum 1 most-significant bit of the result may be cancelled.

As mentioned, some approaches include rounding in the normalization path. In contrast, disclosed embodiments advantageously eliminate the need to perform rounding on the normalization path. Should a scenario arise that an operation being performed on the normalization path needs rounding, the result is instead taken from the concurrently-running alignment path. This is a true subtraction, with exponent-diff>0, which its associated normalization shift-count smaller or equal to one. In this case, the result is taken from the alignment path (rather than the normalization path). Since the normalization path is taken for subtract operations with exponent-diff<=1, in case of normalization shift bigger than or equal to 1, the left-over smaller operand is shifted right such that it is safely not need rounding anymore.

In some embodiments, a processor executing the disclosed FPADD instruction includes circuitry to fetch, decode, and execute an instruction specifying locations of first and second floating-point (FP) sources, and an opcode indicating the processor is to: shift a mantissa of the smaller source FP operand to the right until the FP sources are aligned, generating rounding controls based on any bits that escape; simultaneously generate two sums: one of the FP sources and the other of the FP sources plus one, the sums having a fuzzy-Jbit format with an additional possible Jbit position; select one of the two sums based on the rounding controls; and generate a result comprising a mantissa-wide number of most-significant bits of the selected sum, staring with the most significant non-zero Jbit.

With the reduced latency gained by performing the rounding and the addition in parallel, disclosed embodiments allow the addition to be performed in two cycles.

Alignment

With reference to the alignment path, when the operand exponents are different, their mantissas must be aligned before being added. In disclosed embodiments, the mantissa of the operand with the smaller exponent is shifted right by the difference in their exponents (i.e., expDiff=largeExp−smallExp), thereby bringing the smaller operand in alignment with the larger operand, and allowing them to be added.

Subtraction Vs. Addition

As described herein, trueSub is a bit which shows whether the operation is subtraction or addition, and it is equal to operand1.sign^operand2.sign^subtract_instruction. In case of trueSub the mantissa of larger exp is inverted. The result of addition is negative, but, after inversion the correct result is obtained.

$$^-(a+^-b)=-(a+^-b)-1=-a-(-b-1)-1=b-a$$

In some embodiments, the inversion is done inside circuitry performing the mantissa addition, but not on critical path. The critical path of addition is carry propagation, while inversion is performed prior to carry propagation: inverted_addition_result[i]=(x[i]^y[i]^inversion_required)^c[i], where x[i] is first addend on position i, y[i] is the second addend on same position i and c[i] is carry from previous bits to the position i

Rounding Parameters

When the small mantissa is shifted right, according to some embodiments, low bits (least-significant bits) escape the range of mantissa but are not just allowed to vanish. Rather, escaping low bits are kept and contribute to 3-bit rounding parameters (also referred to as rounding controls): guard[1:0], sticky. Rounding modes, in turn, are to be expressed by formulae with these rounding parameters.

J-Bit Position and Fix

In some embodiments, the operands provided to the disclosed floating-point addition (FPADD) instruction are formatted according to a standard, IEEE 754 specification. (IEEE stands for Institute of Electrical and Electronics Engineers, who published the current version, IEEE 754-2008, in August 2008.) A single-precision floating-point number, according to IEEE 754, includes a sign bit, an 8-bit exponent, and a 23-bit fraction. A normalized single-precision floating-point number includes an implicit Jbit, after the fraction, in a position [23], after the mantissa at position [22:0]. The Jbit is an implicit bit convention, or hidden bit convention, that allows the binary format to have an extra bit of precision.

Disclosed embodiments define and use a "fuzzy-Jbit" format, an intermediate format that extends the mantissa by one bit and allows the Jbit to fall in either position [23] or [24].

Some embodiments take advantage of the fuzzy-Jbit format to decrease the number of rounding options of intermediate results by shifting the addends before calculations, and then fix the result by shifting back according to result's Jbit after the calculation.

Specifically, in some embodiments that are not trueSub (trueSub is used herein to define an operation that is an addition, involving operands of different sign), the Jbit is to be shifted left by 1 bit before the computation, and the result is to be fixed by shifting right by 1 bit if the Jbit of the result is not on position [23].

On the other hand, in some embodiments that are trueSub, the addends are to be shifted right by 1 bit, which is to later be fixed by shifting left by 1 bit, if the Jbit of the result is not on position [23].

Parallel Rounding

Since disclosed embodiments perform parallel rounding, some embodiments aim to decrease number of alternate options to run in parallel. Therefore, before entering the mantissa adder, some embodiments perform the following shift: If not trueSub then shift both operand mantissas to the right by 1 bit. Since the control of this shift is not expected to be in a critical timing path, mux-latches are sometimes used. After this mux-latch, any further fix will only be to shift left by 1 bit. If trueSub and Jbit of larger term is on position 22, then shift both operand mantissas to the right by 1 bit. Since the control of this shift is not expected to be in a critical timing path, mux-latches are sometimes used. After this mux-latch, any further fix will only be to shift left by 1 bit.

Four Alternate Variants of Parallel Rounding

When performing the addition according to disclosed embodiments, there are two possible ranges ([24:1] and [23:0]) for the result mantissa: one which needs to be fixed and one which does not. In case of single accuracy, the ranges are [24:1] and [23:0]. The last one needs fix. According to disclosed embodiments, the result in each range is either rounded up (by adding 1) or not rounded.

As there are two options for the mantissa [24:1] or [23:0] (since this is the definition of the fuzzy-J bit location format), the rounding needs to be done according to the location of the least significant bit (which are 1 and 0 correspondingly). So, the available variants for the result are: {mantissa[24:1], mantissa[24:1]+1, mantissa[23:0], mantissa[23:0]+1}. Accordingly, disclosed embodiments use 2 adders, one is calculating the non-rounded result extended mantissa in fuzzy-Jbit location format (i.e., mantissa[24:0]) and another adder that calculates rounded mantissa[24:1]+1. Referring to these results as NRmantissaA[24:0] (representing non-rounded result with extended, fuzzy-Jbit-format mantissa[24:0]) and RmantissaB[24:1] (representing rounded mantissa[24:1]+1) disclosed embodiments select among the below options:

a) NRmantissaA[24:1]—in case of bit located in 24 and no rounding b) NRmantissaA[23:0]—in case of bit located in 23 and no rounding c) RmantissaB[24:1]—in case of bit located in 24 and round up d) A "fix," by which one of two results is selected:
  i) in case NRmantissaA[0]==0, then {NRmantissaA[23:1], 1'b1}, and
  ii) in case NRmantissaA[0]==1, then {RmantissaB[23:1], 1'b0}

Four Possible Ranges of Result

After finishing alignment shifting, the two mantissas are perfectly aligned. The result of addition is a mantissa either on range0=[mantissaLength−1:0] or on range1=[mantissaLength:1]. The carry c to bit mantissaLength−1 defines the range:

Case 1. Range 1. carry and ~trueSub (i.e., carry and addition of two mantissas). In this case, disclosed embodiments already shifted both terms right and, by virtue of carry, the J-bit is shifted back. Therefore: If carry and ~trueSub then r1;

Case 2. Range 0: carry and trueSub (i.e., carry and subtraction of two mantissas). The result of the subtraction according to disclosed embodiments is negative (subtracting the larger number from smaller). In such embodiments, carry brings additional sign and j-bit is shifted right. Therefore, if carry and trueSub then r0;

Case 3. Range 0. carry and ~trueSub: (i.e., no carry and addition of mantissas). Some embodiments of performing the addition already shifted both terms right. Without carry Jbit stays there. Therefore, if carry and ~trueSub then r0; and Case 4, Range 1. carry and trueSub (i.e., no carry and subtraction of mantissas). In some embodiments performing a subtraction without any carry, the JBit does not move. Therefore, if carry and trueSub then r1.

The result is taken either from r0 or from r1 and correspondingly rounding is done either on r0 or on r1. According to disclosed embodiments, then four variants of the result, S, are generated:

1. S 1. Sum on the range r0.
2. S 2. Sum+1 on the range r0.
3. S 3. Sum on the range r1.
4. S 4. Sum+1 on the range r1.

Of course, some embodiments avoid generating four additions, and instead calculate only two sums: 1) a Sum on the range [mantissaLength:0], and 2) a Sum+2 on the same range. The four variants of the result, S1-S4, are derived from these two results.

Disclosed embodiments then use a 4:1 multiplexer to select one of S1-S4. The controls are calculated in the following order: first, preparing round controls for r0 and r1: rup0 and rup1, and second, defining range r0, r1 according to carry c.

Reducing Latencies of Rounding and Final Adjustment at End to Normalization Path As mentioned above, in some approaches, floating-point addition operations suffer from latency required to perform two operations: 1) a final adjustment by one bit after normalization shift and 2) rounding the result. Disclosed embodiments improve on both problems using what are sometimes referred to herein as "Exact LCA" and "fuzzy-Jbit format." Both latency improvements are further described below and illustrated in the accompanying Figures.

Improving on Latency of Final, Post-Normalization, 1-Bit Shift Adjustment

Disclosed embodiments describe a Fast-Adder, using what is sometimes referred to herein as "Exact LCA," to improve on the speed path associated with the final adjustment after normalization. In particular, the exact LCA resolves the speed path which is associated with final adjustment, by significantly speeding up the indication for this final adjustment. The final adjustment latency is also reduced using the disclosed "fuzzy-Jbit format." In particular, by this format, the Jbit can be located in either of locations [24] and [23]. A final 1-bit shift is not needed; disclosed embodiments just ensure the Jbit is bounded, as was described earlier.

Improving on Latency of Rounding the Result

Disclosed embodiments improve on the latency of rounding the result by eliminating the rounding altogether on the normalization path. As was mentioned above, disclosed embodiments describe using the normalization path in scenarios involving the characteristics: 1) a true subtraction operation, 2) an exponent-difference of less than or equal to 1, and 3) shift-count<=1. These three characteristics being met represent the only case requiring rounding in the normalization path, and, in this case, it is recognized that the result can be collected from the alignment path (in which parallel rounding is done by the fast adder, or in case of a fuzzy-Jbit formatted result, the rounding parameters are calculated and transferred to the next operation).

Disclosed embodiments improve on the first latency problem, the final adjustment latency, using a priority encoder which is sometimes referred to as an "exact LCA." Disclosed embodiments improve on the second latency problem, rounding the final result by relying on properties of normalized result. Both latency improvements are further described below and illustrated in the accompanying Figures.

Disclosed embodiments improve floating-point addition latency in at least two ways: 1) eliminating the need for final adjustment after normalization, and 2) eliminating the need for final rounding. As described below, some embodiments utilize a fuzzy-Jbit location that allows the Jbit to lie in multiple possible locations and obviates the need for rounding. In some embodiments, including for example in GEMM (GEneral Matrix Multiplication or GEneral Matrix-to-Matrix Multiplication) algorithms commonly used in machine learning contexts, results of a fused multiply-add (FMA) operation are forwarded to the next FMA operation, and, if rounding is required, the next FMA operation is instead masked with adding a 1 to its accumulation.

Two Calculation Paths: Normalization and Alignment

Some disclosed floating-point adder embodiments use a dual-path circuit, adding FP operands on either a normalization path or an alignment path. The normalization path is to be used when the operation is a trueSub (trueSub=sub^sign1^sign2, i.e., a true subtraction) and the absolute value of the difference between the exponents is less than or equal to one; i.e., |exp1−exp2|≤1. Otherwise, the alignment path is used. In order to avoid rounding on normalization path the result is taken from alignment path if the normalization shift count is 0. In some embodiments, the alignment path is also used if the alignment shift-count is less than 1.

On the alignment path a maximum of 1 most-significant bit of the larger mantissa is canceled, eliminating the need for final adjustment after normalization, and the need for final rounding. This property is used for normalization and rounding of alignment path result. LCA stands here for Leading Change Anticipator. Cancelation means "shifting left out" because it is a sign bit (sign is always MSB). Final adjustment is not eliminated here (in parallel rounding of fast adder). It is eliminated by fuzzy-JBit format that allows multiple locations for the Jbit and no rounding required.

Cancelation means zeroed as the example shows: 101−010=011. The accuracy is maintained as can be seen from this example (i.e. 5−2=3 which is accurate). The elimination for the final adjustment is described in various sections above.

FIG. 22D illustrates floating-point values used in an exemplary execution of a floating-point addition (FPADD) instruction, according to some embodiments. As shown, the fuzzy-Jbit location format, which allows the Jbit to be bounded in locations 24 or 23 (i.e. the result is taken from the alignment path in this case, and this is the only case that need rounding. The alignment path has the capability to do rounding (either by parallel rounding in the Fast Adder, or by calculating the round parameters for the next FMA in the line). The rounding is eliminated as described above, including in the section entitled "Two Calculation Paths: Normalization and Alignment."

In some embodiments, LCA (Leading Change Anticipator) circuitry predicts the first bit which is not sign. For instance, for positive value 000001xxx, the location of the first '1' is predicted and, in contrast, in the case of a negative value 111110xxx, the location of the first '0' is predicted.

In some applications, for example in the case of GEMM (General Matrix-to-Matrix Multiplication) frequently used in a machine learning context, the inputs and the weights that are to be multiplied typically have positive values, so the normalization path will not be involved, and final adjustment is not a concern. In such cases, disclosed embodiments using the fuzzy-Jbit format leave the Jbit in either bit [23] or bit [24].

In Fast Adder applications, some embodiments use an exact LCA (Leading Change Anticipator) circuit, which predicts the first non-sign bit, as described above and as illustrated in FIG. 22B, and which provides the final adjustment at the same time the LCA provides its shift-count.

On the normalization path the alignment is relatively simple, calling for a maximum shift of the mantissa of the smaller number by 1 bit. But such alignment can cause massive cancellation of most significant bits with following normalization is possible (shifting out of all sign bits, i.e., If two numbers a and b are close, then a-b may be much less than a or b. disclosed embodiments subtract mantissas of a and b and obtain several MSB equal to the sign. But the highest bit (j-bit) of mantissa should be different from sign. So, some embodiments shift left the result and leave no sign in mantissa, thereby normalizing the result.). Such normalization, especially in scenarios involving massive cancelation, is time consuming and following it with rounding poses a challenge in terms of achieving the desired clock frequency.

To avoid the additional latency of such a rounding caused by the 1-bit shift, disclosed embodiments, in a case of normalization shift requiring rounding (e.g., if a right-shift causes the least-significant bit to drop off, rounding may be needed), take the result from the alignment path, as described above including in the section entitled: "Two Calculation Paths: Normalization and Alignment."

The one bit alignment shift, which is done before the adder, is not dropped off. In case of normalization shift left, it is returned back to the mantissa result. In case of normalization-shift-count<=1, disclosed embodiments are not concerned, since the result is taken from the alignment path. Shifting out of all sing bits is required for getting normalized FP value. A FP format says the value is between [1:2) (i.e. it is always 1.xxxxx, unless it is zero 0.000 . . . 0). So, disclosed embodiments subtract two values, like the following Example 1:

$$1.01010-1.01000=0.00010, \quad \text{Example 1}$$

and this value has 4 leading zeros. Disclosed embodiments in such cases shift the leading zeros and adjust the exponent accordingly and get $1.0*(2^-4)$. In other words, several of the most-significant bits are equal to the sign. Some scenarios, like Example 1, have 4 MSB bits equal to zero (for comparison, not that in case of 1.01000−1.01010=1.11101, which contains 4 MSB=1). Disclosed embodiments calculate the shift-count using the LCA, and in Example 1, with the result being equal to 0.00010 m the shift count that the LCA would calculate is 4. The shift-count is also used for updating the exponent and if the value is $0.00010*2^0$, it would become $1.00000*2^-4$.

When Rounding is Required on Normalization Path.

In some scenarios, depending on the input operands to the floating-point adder, rounding Is required. In a first example of rounding elimination, |exp1−exp2|=1 and no cancellation of most significant bit is done. In such a scenario, the result is 1 bit longer than the format supports, so rounding is required. This case is easily detected on early stage by applying the equation below to determine whether "Align-needed."

FIG. 22D illustrates floating-point values used in an exemplary execution of a floating-point addition (FPADD) instruction, according to some embodiments. As shown, a is a normalization path operating in a scenario with normalization-shift-count<=1 (as shown, exp-diff equals 1), and disclosed embodiments take the result from. So, in this scenario, no rounding is required in the normalization path.

In case the normalization shift-count==0, the bit that is located in [−1] should be used for doing rounding. But in this case, disclosed embodiments take the result from the concurrently-running alignment path, and rounding is avoided in the normalization path.

In case the normalization shift-count>=1, this bit is shifted back to location [0] or higher, disclosed embodiments need not round in that case either.

Align-needed=((exp1>exp2) & (fraction1.msb is 1))| ((exp2>exp1) & (fraction2.msb is 1)).

When it is determined that rounding is required, disclosed embodiments use the alignment path instead of the normalization path.: So, when Align-needed=1 disclosed embodiments use the alignment path, where rounding is done, to generate a result.

Case 1 of Rounding Elimination

In some embodiments, rounding is eliminated altogether from the normalization path. Scenarios that exemplify this first case of rounding elimination start by setting large and small mantissas, based on analyzing bits [1:0] of the operands' exponent, as follows:
large=f1.exp[1:0]≥f2.exp[1:0]? f1.mantissa: f2.mantissa;
small=f1.exp[1:0]<f2.exp[1:0]? f1.mantissa<<1:

Then, if bit[0] of the two operands' exponent differ, the f2 mantissa is shifted by one, as follows:

4 (f2.exp[0]≠f1.exp[0]? f2.mantissa<<1: f2.mantissa);

Next, the exponent difference and inverted exponent difference are calculated as follows:
diff=small+~large which is normalized.
If diff<0 then ~diff≥0 and
~diff=~(small+~large)=−(small−large−1)−1=large-small The inversion of the result is done in the adder: (smaller+ ~larger) on non-critical path and using noncritical control: f1.exp[0]=f2.exp[0] & f1.mantissa≥f2.mantissa;

Finally, the calculated difference is used to generate a result as follows:
Sum=

In the case of true ADD the result is positive (i.e. result=smaller+larger). In case of true SUB, in case the larger mantissa is inverted, adder obtains negative result (i.e. ~larger+smaller<0). So, it is required to invert it, so Result=~ (smaller+~larger)=−(smaller+~larger)−1=−(smaller−larger− 1)−1=−snnaller+larger>0.

Case 2 of Rounding Elimination

In some embodiments, rounding is eliminated altogether from the normalization path. Scenarios that exemplify this first case of rounding elimination start by setting large and small mantissas, based on analyzing bits [1:0] of the operands' exponent, as follows: If both exponents are equal, then diff0, and no need to revert the diff. According to disclosed embodiments, if rounding is required by an operation being performed by the normalization path, the result is taken from the alignment path (as described above and in the section entitled: "Two Calculation Paths: Normalization and Rounding"), taking advantage of the rounding performed by the Alignment path and obviating the need to add an additional rounding latency to the normalization path.

As mentioned above, some disclosed floating-point adder embodiments use a dual-path circuit, adding FP operands on either a normalization path or an alignment path. The normalization path is to be used when the operation is a trueSub (trueSub=sub^sign1^sign2, i.e., a true subtraction) and the absolute value of the difference between the exponents is less than or equal to one; i.e., |exp1−exp2|≤1. Otherwise, the alignment path is used.

On the normalization path the alignment is relatively simple, calling for a maximum shift of the mantissa of the smaller number by 1 bit. But such alignment can cause massive cancellation of most significant bits with following normalization is possible (shifting out of all sign bits; i.e., if two numbers a and b are close, then a-b may be much less than a or b; disclosed embodiments subtract mantissas of a and b and obtain several MSB equal to the sign). Such normalization, especially in scenarios involving massive cancelation, is time consuming and following it with rounding poses a challenge in terms of achieving the desired clock frequency.

result=small−large=diff+1.

To avoid the additional latency of such a rounding caused by the 1-bit shift, disclosed embodiments, in a case of normalization shift requiring rounding (e.g., if a right-shift causes the least-significant bit to drop off, rounding may be needed), take the result from the alignment path, as described above including in the section entitled: "Two Calculation Paths: Normalization and Alignment."

This "rounding" is eliminated on the last stage of the regular recursive algorithm of addition by dividing into blocks. The main problem here is that signal "diff0" is late. Below, a solution is proposed in the adder "small+~large" without additional delay.

Carry-Rotation

The larger source is inverted, and the result of addition is inverted back. If the larger source was erroneously selected (in case of same exponents), then the result of addition need not be inverted, and 2's completion 1 should be added. Instead of incrementor, the 2's completion is done on the last stage of addition, when carry propagation is performed by (for example) 4 blocks of 16-bits: the 4th block carry-out defines the sign of result (if it is 1 then the sign is positive, else negative). So, is used as the first block's carry-in:

In one example, there are four blocks B [3:0]. For each block G [3:0]=generate carry in block and P [3:0]=propagate carry through block. For each block B [3:0] denote by Cin [3:0] its carry in. Then Cin [0]=G [3]|P[3]&G[2]|P[3]&P[2]&G[1]|P[3]&P[2]&P[1]&G[0];

Cin[1]=G[0]|P[0]&G[3]|P[0]&P[3]&G[2]|P[0]&P[3]&P[2]&G[1];

Cin[2]=G[1]|P[1]&G[0]|P[1]&P[0]&G[3]|P[1]&P[0]&P[3]&G[2];

Cin[3]=G[2]|P[2]&G[1]|P[2]&P[1]&G[0]|P[2]&P[1]&P[0]&G[3];

These Cin will define the result for each block.

(6.4) Adjustment Elimination (Exact LCA/LZA)

A new type of priority encoder is invented on LCA mask, which finds at once the correction of the normalization by 1 bit. The advantage is that this control is found early, thus no need to wait for the result of normalizer shifter in order to find this control. The main idea of exact LCA is simultaneous look up for the leftmost zero of LCA mask and carry (in the adder) to the same point. In order not to increase area, the work is done in the normalization path adder.

The standard algorithm of priority encoder is used on area [56:1], where on bits [56:53] there are sign extensions of Larger: 111 and smaller: 000. This is done in order to have good blocks for VS0. VS1 of single precision.

(6.4.1) 4-Bits Blocks (14 Blocks)

13 12 11 10 9 8 7 6 5 4 3 2 1 0 xxxx | xxxx | xxxx | xxxx | xxxx | xxxx | xxxx |
xxxx | xxxx | xxxx | xxxx | xxxxx | xxxx | xxxx (6.4.2) 16-Bit Blocks 16-bits blocks (3 blocks of 4 previous hierarchy blocks + low 2-blocks block)

xxxx | xxxx | xxxx | xxxx | xxxx | xxxx | xxxx |
xxxx | xxxx | xxxx | xxxx | xxxxx | xxxx | xxxx (6.4.3) Full Length Full length (1 block of 4 previous hierarchy). Separately blocks for VS1 and VS0 are built separately of 4 and 16 bits blocks.

13 12 11   10 9 8 7 6 5 4   3 2 1 0

|          VS1          |  |       VS0       |

The algorithm is described in the following way:
1. For each 4-bits block find
2. Z4=leftmost zero of LCA mask.
3. G4=carry generated in the block to the leftmost zero.
4. P4=carry propagated from right end of the block to the leftmost zero.
5. Using Z4, G4 and P4, for each 16 bits block find
6. Z16=leftmost zero of LCA mask.
7. G16=carry generated in the block to the leftmost zero.
8. P16=carry propagated from right end of the block to the leftmost zero.

Using Z16, G16 and P16, for each 16 bits block find ZL=leftmost zero of LCA mask and carry CL to the leftmost zero. If Cout=carry out of the adder, then additional shift left by one bit is necessary if Cout≠CL:

If Cout then result of normalization path adder is positive and CL shifts j-bit to the left. result=0000001xxxxx . . . .

If ~Cout then normalization adder is negative and ~CL leaves j-bit on left position. result=1111110xxxxx.

Floating-Point Formats

Figures 21A, 21B, 21C:
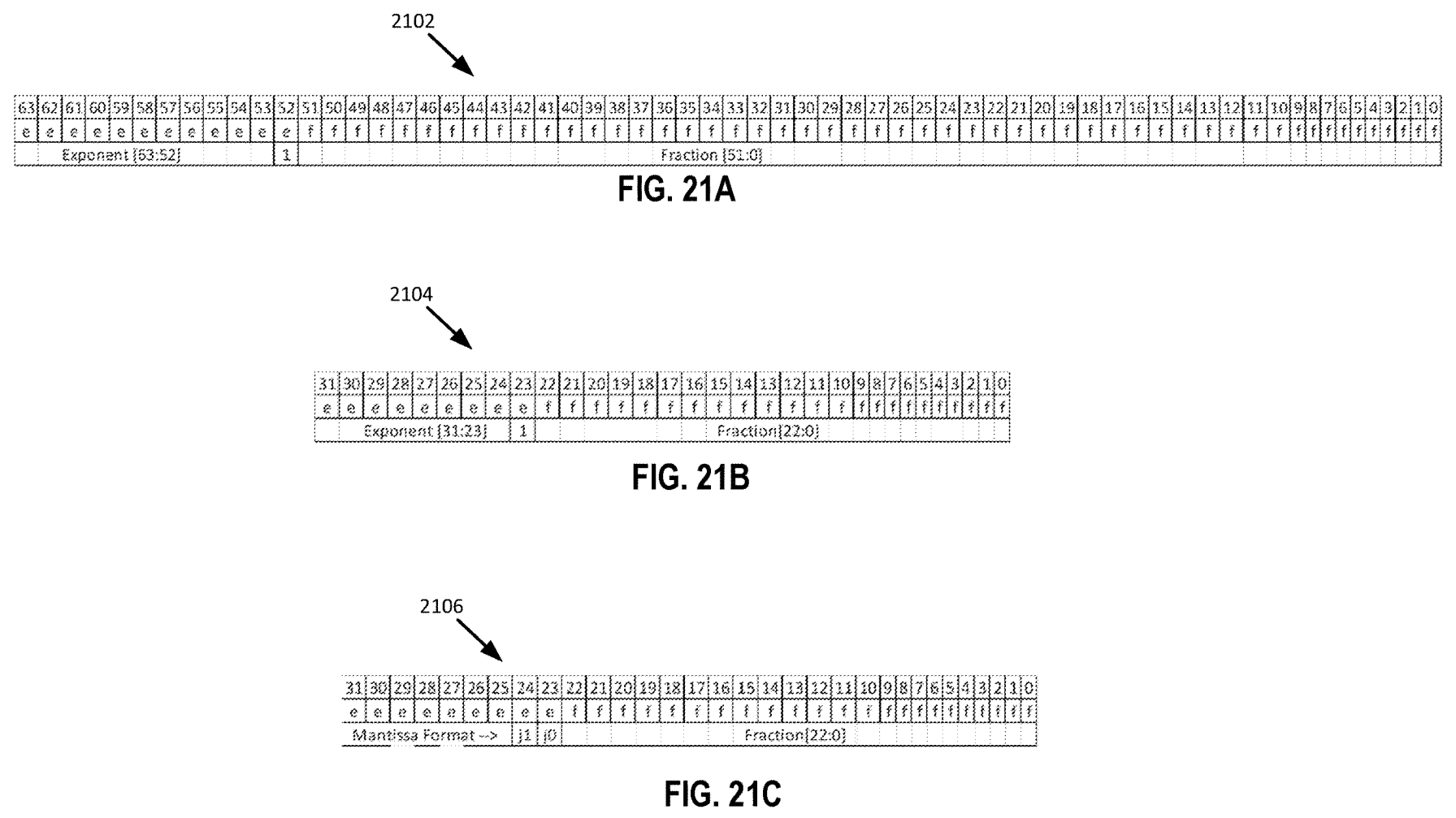

FIGS. 21A-C illustrate floating-point formats; according to some embodiments.

FIG. 21A illustrates a double-precision floating-point format consistent with the IEEE 754 standard. As shown, FP format 2102 is a double-precision format having 64 bits, of which bits [51:0] are the significand (also referred to sometimes as the mantissa, the coefficient, or the fraction), bits [62:52] are the exponent, bit 63 is a sign bit, and bit [52] is a hidden Jbit.

FIG. 21B illustrates a single-precision floating-point format consistent with the IEEE 754 standard. As shown, FP format 2104 is a single-precision format having 32 bits, of which bits [22:0] are the significand (also referred to sometimes as the mantissa, the coefficient, or the fraction), bits [30:23] represent the exponent, bit 31 is a sign bit, and bit [23] is a hidden Jbit.

FIG. 21C illustrates a single-precision fuzzy-Jbit floating-point format as defined and used according to some embodiments herein. As shown, fuzzy-Jbit FP format 2106 is a single-precision format having 32 bits, of which bits [22:0] are the significand (also referred to sometimes as the mantissa, the coefficient, or the fraction), bits [30:23] represent the exponent, bit 31 is a sign bit. Here, the mantissa is extended by one bit, such that the Jbit can be located in either of bits [23] or [24].

Exemplary Execution

Figure 22A:
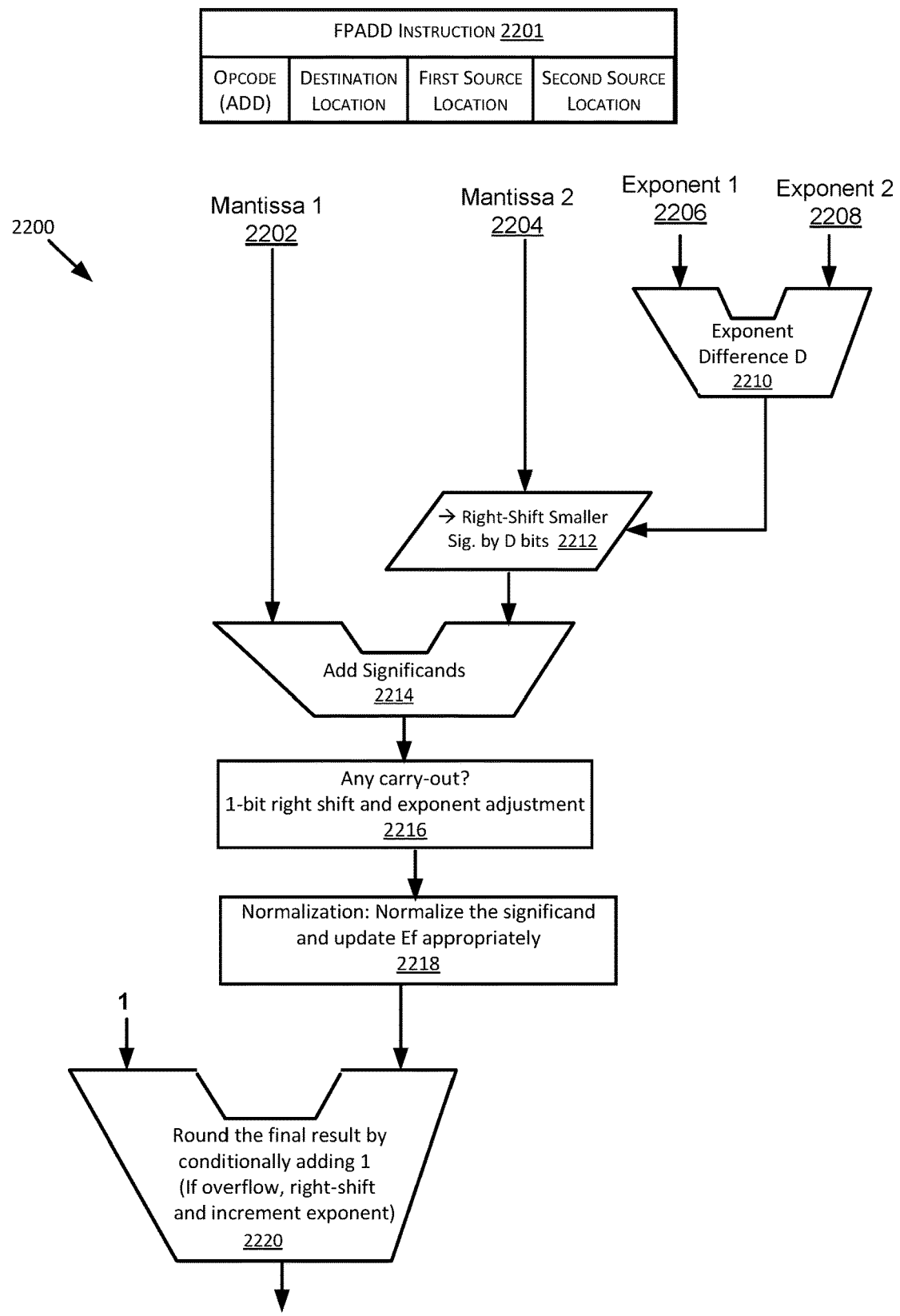
FIG. 22A illustrates functional components used in performing an exemplary execution of a floating-point addition (FPADD) instruction.

FIG. 22A illustrates functional components of an exemplary execution of a floating-point addition (FPADD) instruction. Disclosed embodiments perform these functions in a dual-path execution circuit. As shown, circuit 2200 is to execute an FPADD instruction 2201, which has fields to specify an opcode (ADD), and locations of first source, second source, and destination operands. In operation, circuit 2200 at 2210 is to determine the difference, D, between exponent 1 2206 and exponent 2 2208. The resulting exponent difference from subtractor 2210 is to drive shifter 2212 to right shift the smaller mantissa, here, mantissa 2204 to the right by D bits, thereby aligning mantissas 2202 and 2204 so that they can be added by adder 2214. Any bits that escape or fall off of the LSB of mantissa 2204 are retained and affect rounding controls. The sum generated by adder 2214 could have a carry-out from the most significant bit, in which case at block 2216, the sum is shifted to the right by 1 bit and the exponent adjusted accordingly. At 2218, the significand is normalized such that the Jbit is a 1, and the exponent updated accordingly. Finally, at 2220, the significand is rounded, if necessary, by adding a 1, which, if so doing causes an overflow, causes the significand to be right-shifted by 1 bit and the exponent updated.

Disclosed embodiments perform the functions of circuit 2200 in two paths: a normalization path and an alignment path. The dual-path implementation advantageously allows some functions to be performed in parallel, rather than serially, which alleviates critical timing paths and allows a processor to run at a higher frequency.

As shown, the components of the circuit for performing the FPADD instruction, appear to operate serially, which, depending on the processor technology, can fail to complete in one cycle.

Disclosed embodiments, however, perform one or more of the functions illustrated in FIG. 22A in parallel, thereby allowing the circuit to perform inn a single cycle.

Figure 22B:
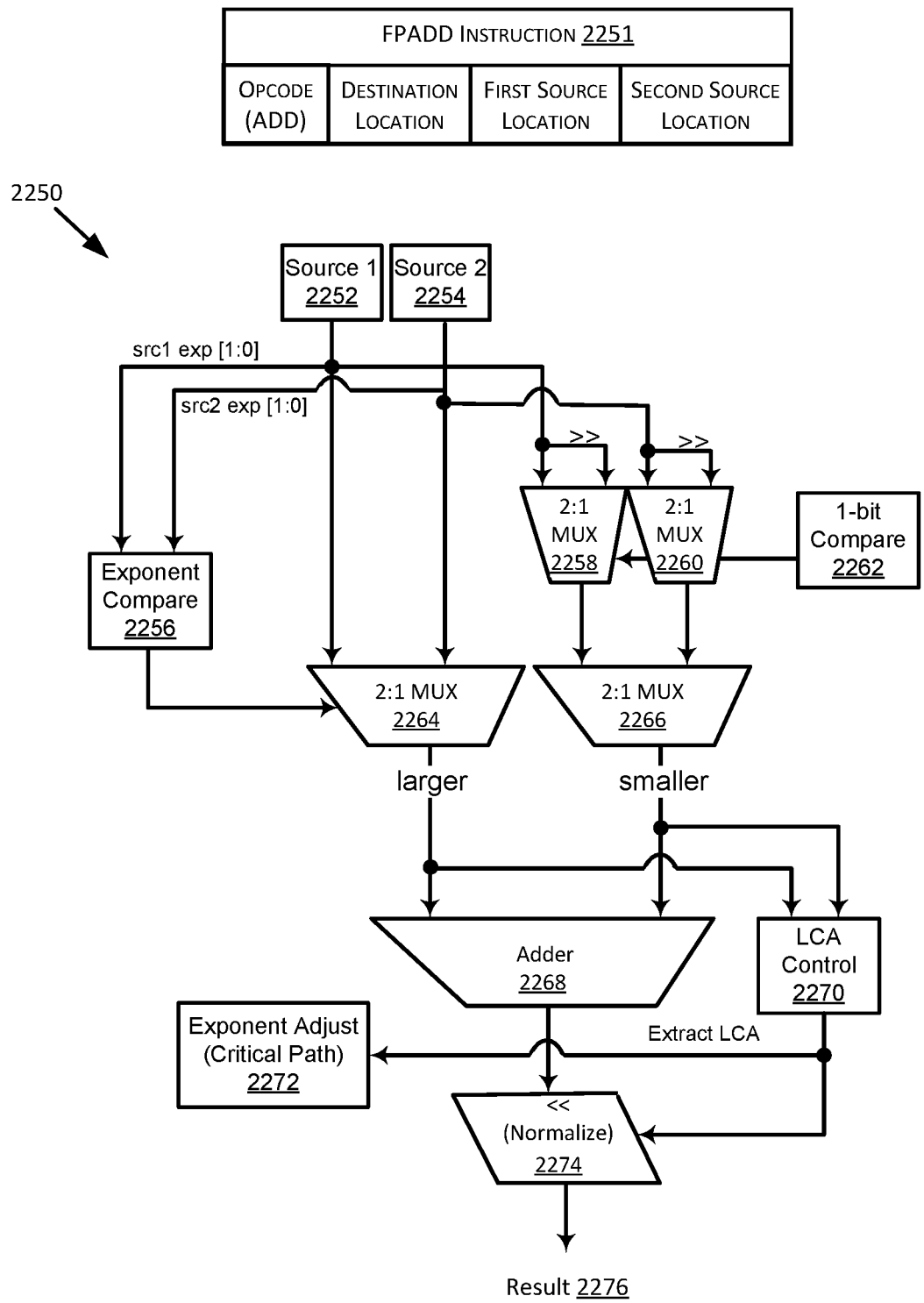
FIG. 22B illustrates an exemplary normalization path used in execution of a floating-point addition (FPADD) instruction, according to some embodiments.
Figures 22C, 22D:
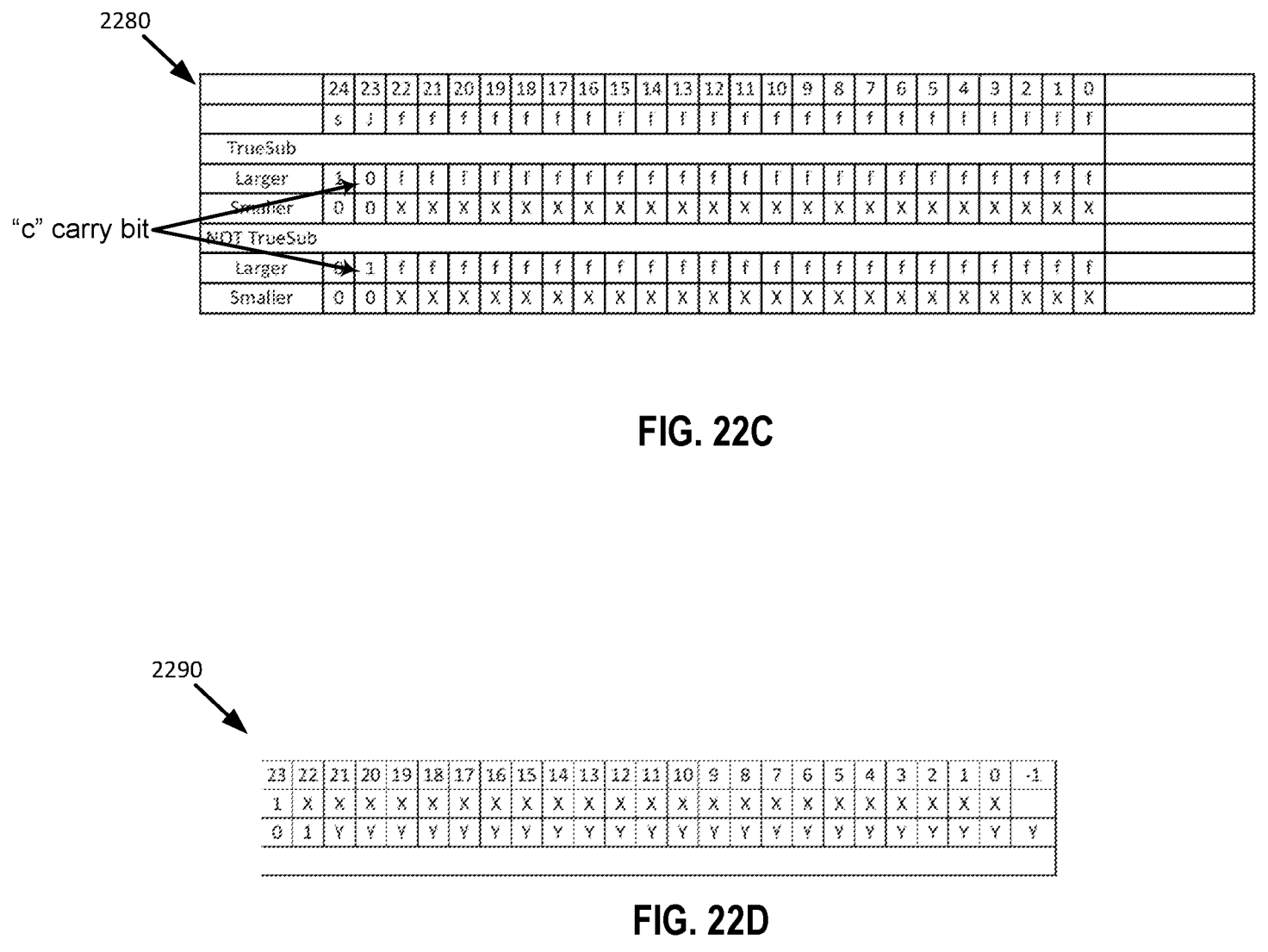

FIG. 22B illustrates an exemplary normalization path used in execution of a floating-point addition (FPADD) instruction; according to some embodiments. In operation, normalization path 2250 is to use fetch circuitry (not shown) to fetch instruction 2251, which specifies an opcode, and first source, second source, and destination floating-point numbers. The opcode of the FPADD instruction 2251 is to indicate that the processor is to shift a mantissa of the smaller source FP operand to the right until the FP sources are aligned, generating rounding controls based on any bits that escape; simultaneously generate two sums: one of the FP sources and the other of the FP sources plus one, the sums having a fuzzy-Jbit format with an additional possible Jbit position; select one of the two sums based on the rounding controls; and generate a result comprising a mantissa-wide number of most-significant bits of the selected sum, starting with the most significant non-zero Jbit.

As shown, bits [1:0] of the exponents of source 1 2252 and source 2 2254 are fed into exponent compare circuit 2256. The result of exponent compare circuit 2256 are used to drive multiplexers 2264 and 2266, which cause the larger and smaller mantissas to be routed, as shown, to 54-bit adder 2268. Multiplexers 2258 and 2260, as controlled by 1-bit compare 2262, drive the inputs to multiplexer 2266. The outputs of multiplexers 2264 and 2266 are routed to adder 2268 and LCA control 2270, which drives exponent adjust circuit 2272. Multiplexers 2264 and 2266 drive the larger and smaller operands to adder 2268, which drives an intermediate result to normalizing circuit 2274, which outputs the result 2276 of the operation.

The normalization path is selected in the end or calculations if exponent difference is less or equal to 1. In such case the bit 1 is sign. So disclosed embodiments decide the alignment of sources by 2 bits of exponent difference. If, by chance, exponent difference is large, then the result of alignment path is selected in the end of calculations and normalization path result does not matter.

The specified data sources and destination for this instruction is in any one of a scalar floating-point register, a packed-data vector register having floating-point vector elements, and a matrix (tile) having floating-point numbers as elements.

FIG. 22C illustrates floating-point values used in an exemplary execution of a floating-point addition (FPADD) instruction, according to some embodiments. As shown, floating point formats 2280 are intermediate results of an FPADD operation involving a larger and a smaller mantissa and indicating the presence of a carry bit. Here, after finishing alignment shifting, the two mantissas are perfectly aligned. The result of addition is a mantissa either on range0=[mantissaLength−1:0] or on range1=[mantissaLength:1]. The carry c to bit mantissaLength−1 defines the range. In operation, the FPADD circuitry is to use the information in intermediate results 228 to decide which of four cases govern execution, as described above in the below section entitled "Four possible ranges of result."

Systems and methods for performing a FPADD instruction are further illustrated and described with respect to FIGS. 23, 28A-B, and 29A-B. The format of FPADD instructions is further illustrated and described with respect to FIGS. 24, 25AA-B, and 26A-D26.

Exemplary Method(S) of Execution

Figure 23:
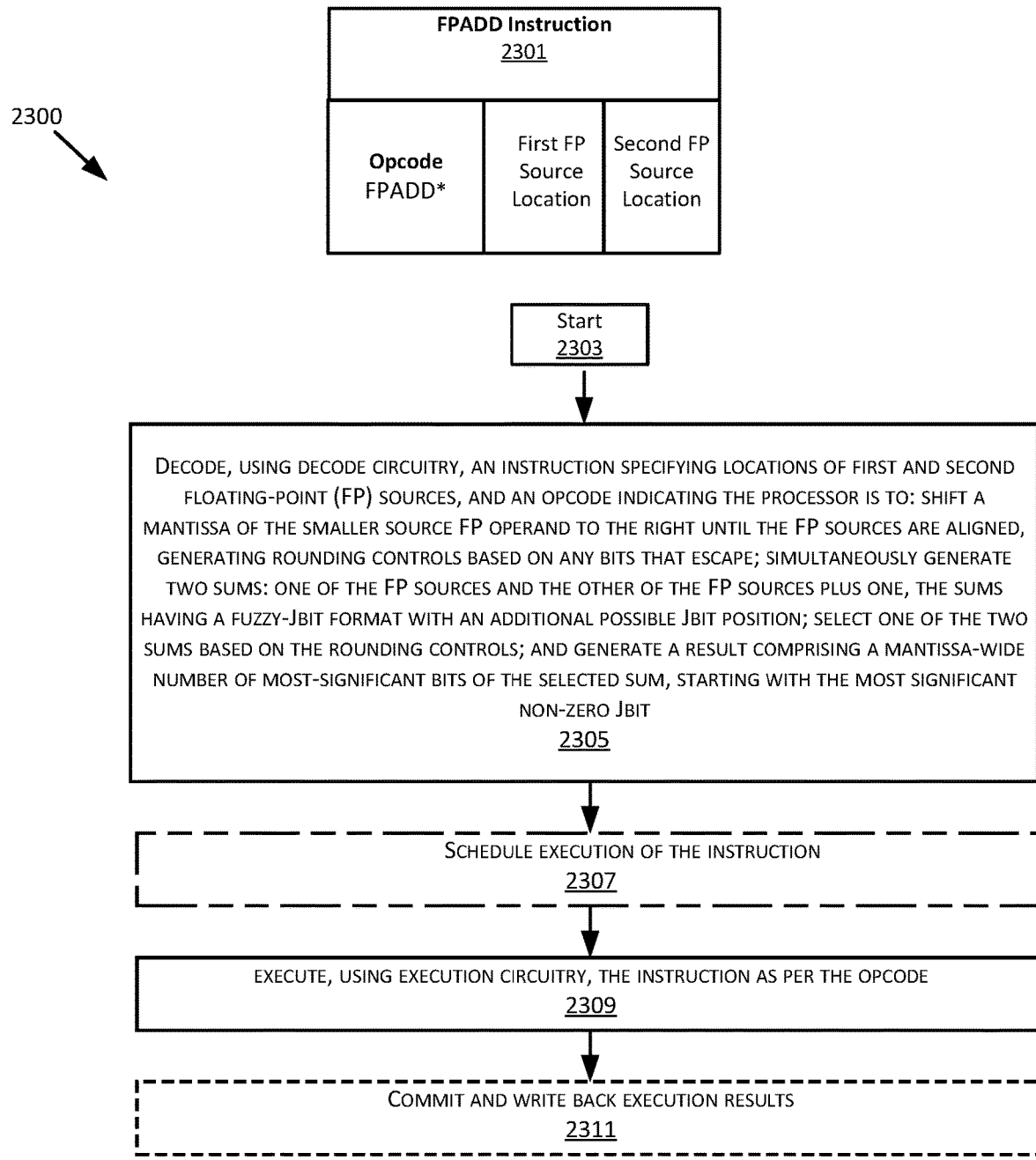
FIG. 23 illustrates an embodiment of a processor executing a flow to process a floating-point addition (FPADD) instruction.

FIG. 23 illustrates an embodiment of a processor executing a flow 2300 to process a FPADD instruction 2301. As shown, after starting at 2303, the processor at 2305 is to decode, using decode circuitry, an instruction specifying locations of first and second floating-point (FP) sources, and an opcode indicating the processor is to: shift a mantissa of the smaller source FP operand to the right until the FP sources are aligned, generating rounding controls based on any bits that escape, simultaneously generate two sums: one of the FP sources and the other of the FP sources plus one, the sums having a fuzzy-Jbit format with an additional possible Jbit position, select one of the two sums based on the rounding controls, and generate a result comprising a mantissa-wide number of most-significant bits of the selected sum, starting with the most significant non-zero Jbit. For example, the fetched FPADD instruction is decoded by decode circuitry such as that detailed herein. In the context of the illustrated system, decode circuitry is like that illustrated and described at least with respect to FIGS. 13, 14, and 28A-B.

Execution of the decoded instruction is scheduled (as needed) at 2307, which is optional (as indicated by its dashed border) insofar as it may occur at a different time, or not at all.

At 2309, the processor executes the instruction as per the opcode. Execution circuitry is further illustrated and described with respect to FIGS. 3-14. In some embodiments, execution circuitry is a matrix operations accelerator, such as that illustrated and described as accelerator 307 (FIG. 3). In some embodiments, execution circuitry is a matrix operations circuit, such as matrix operations circuitry 405 (FIG. 4), 505 (FIG. 5), or 1213 (FIG. 12), and 1327 (FIG. 13). Execution circuitry is further illustrated and described with respect to FIG. 22B.

In some embodiments, the instruction is committed or retired at 2311, which is optional (as indicated by its dashed border) insofar as it may occur at a different time, or not at all.

Exemplary Instruction Format(S)

Figure 24:
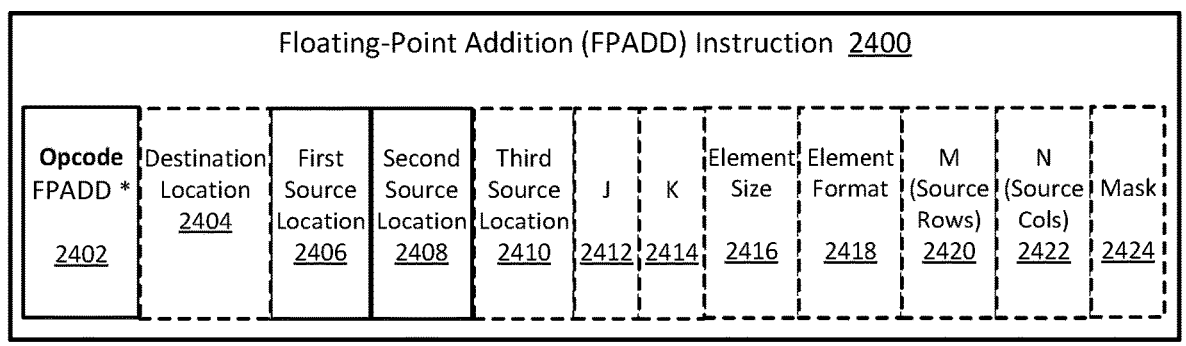
FIG. 24 is a block diagram illustrating a format of a floating-point addition (FPADD) instruction according to some embodiments.

FIG. 24 is a block diagram illustrating a format of a FPADD instruction, according to some embodiments. As shown, FPADD instruction 2400 includes fields for specifying an opcode 2402, indicating that the processor is to shift a mantissa of the smaller source FP operand to the right until the FP sources are aligned, generating rounding controls based on any bits that escape, simultaneously generate two sums: one of the FP sources and the other of the FP sources plus one, the sums having a fuzzy-Jbit format with an additional possible Jbit position; select one of the two sums based on the rounding controls; and generate a result comprising a mantissa-wide number of most-significant bits of the selected sum, starting with the most significant non-zero Jbit. An example of opcode 2402 is FPADD*.

Instruction 2400 further includes locations of an optional destination 2404, first source 2406, second source 2408 and optional third source 2410. Destination 2404 and third source 2410 are optional, as indicated by their dashed borders, insofar as the instruction may call for results to be written to a specified destination or to a specified third source location. Depending on the opcode, the sources and destination may be any of a scalar floating-point register, a packed-data vector register having floating-point vector elements, and a matrix (tile) having floating-point numbers as elements.

FPADD instruction 2400 further includes several optional parameters to control the processor's behavior, including J 2412, K 2414, element size 2416 (word, doubleword, or quadword), element format 2418 (single or double-precision floating point data), M 2420 (source rows), N 2422 (source columns), and mask 2424 (multi-bit value with one bit per destination element, the bit to control whether the destination element is to be updated, or if it is to be zeroed or merged.).

Opcode 2402 is shown including an asterisk, which is to convey that additional prefixes and/or suffixes may be added to specify instruction behavior. One or more of instructions modifiers 2412, 2414, 2416, 2418, 2420, 2422, and 2424 in some embodiments are specified using prefixes or suffixes to opcode 2402.

In some embodiments, one or more of optional instructions modifiers 2412, 2414, 2416, 2418, 2420, 2422, and 2424 are encoded in an immediate field (not shown) optionally included with the instruction 2400. In some embodiments, one or more of optional instructions modifiers 2412, 2414, 2416, 2418, 2420, 2422, and 2424 is specified via a configuration/status register (e.g., XTILECONFIG). In other words, when any one or more of optional modifiers 2412, 2414, 2416, 2418, 2420, 2422, and 2424 are not specified by the instruction, they sometimes use implicit parameters that are inherited from other parts of the tile architecture.

Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 25A:
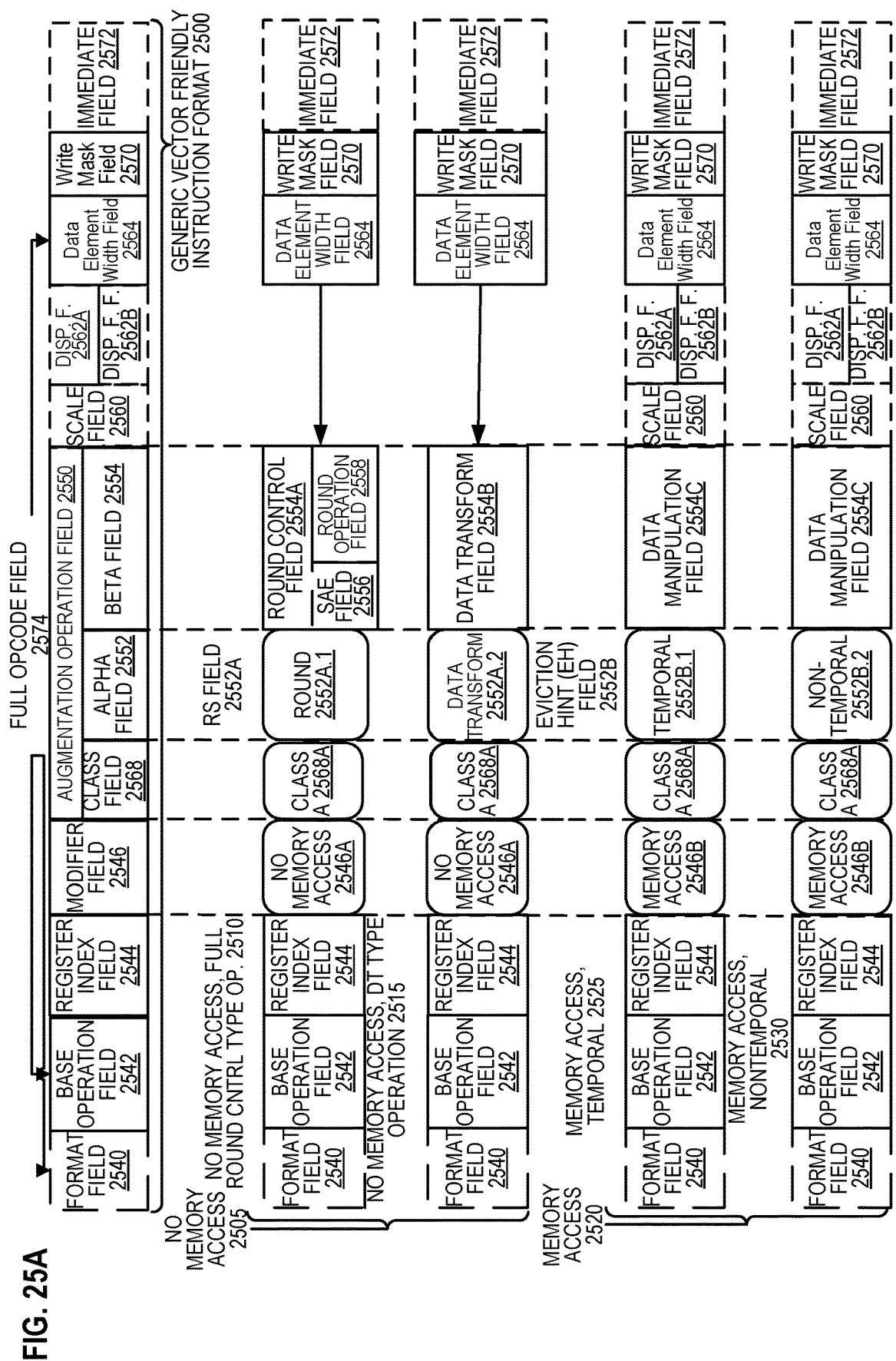
FIGS. 25A-25B are block diagrams illustrating a generic vector friendly instruction format and instruction templates thereof according to embodiments.
Figure 25B:
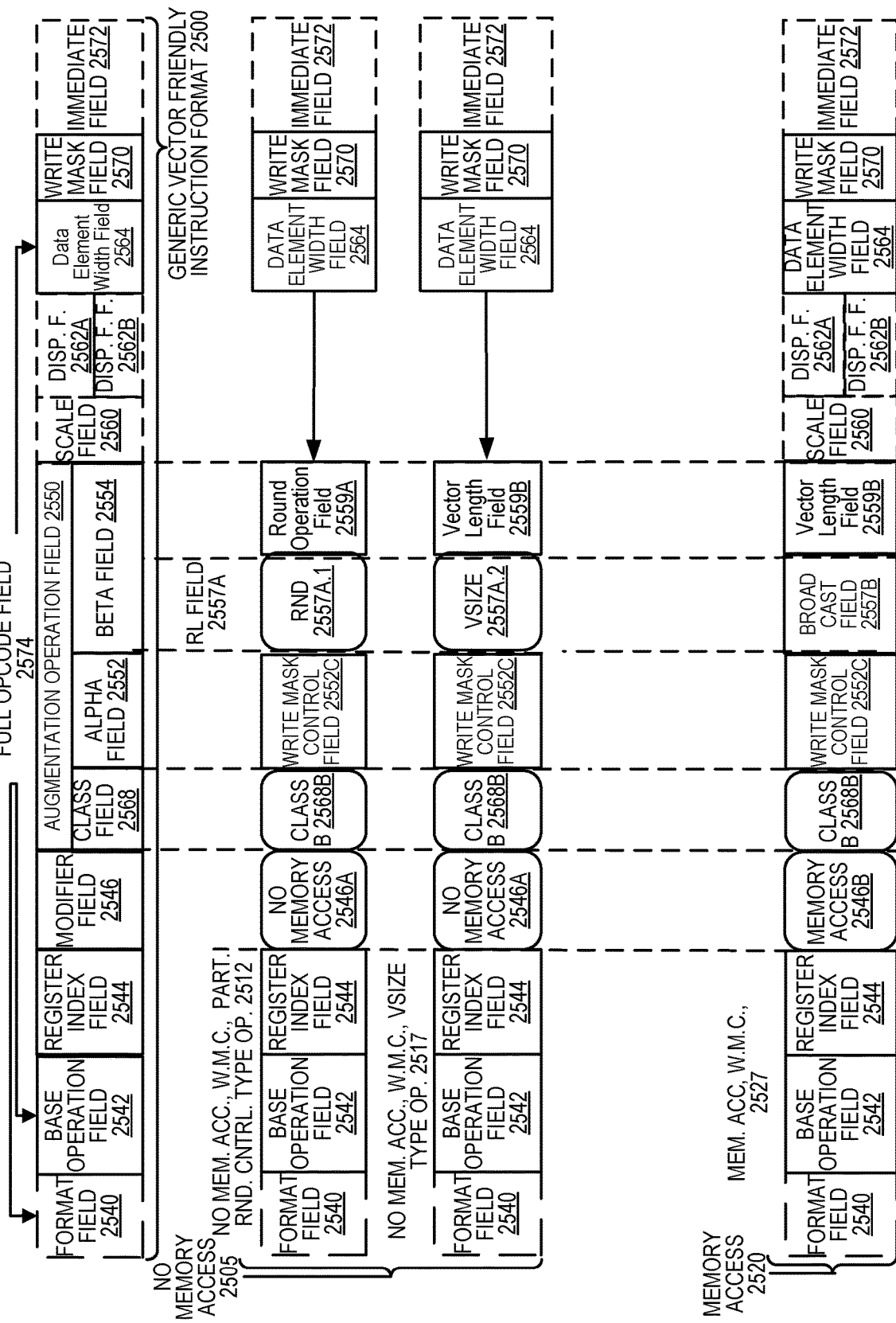

FIGS. 25A-25B are block diagrams illustrating a generic vector friendly instruction format and instruction templates thereof according to embodiments. FIG. 25A is a block diagram illustrating a generic vector friendly instruction format and class A instruction templates thereof according to embodiments; while FIG. 25B is a block diagram illustrating the generic vector friendly instruction format and class B instruction templates thereof according to embodiments. Specifically, a generic vector friendly instruction format 2500 for which are defined class A and class B instruction templates, both of which include no memory access 2505 instruction templates and memory access 2520 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 25A include: 1) within the no memory access 2505 instruction templates there is shown a no memory access, full round control type operation 2510 instruction template and a no memory access, data transform type operation 2515 instruction template; and 2) within the memory access 2520 instruction templates there is shown a memory access, temporal 2525 instruction template and a memory access, non-temporal 2530 instruction template. The class B instruction templates in FIG. 25B include: 1) within the no memory access 2505 instruction templates there is shown a no memory access, write mask control, partial round control type operation 2512 instruction template and a no memory access, write mask control, vsize type operation 2517 instruction template; and 2) within the memory access 2520 instruction templates there is shown a memory access, write mask control 2527 instruction template.

The generic vector friendly instruction format 2500 includes the following fields listed below in the order illustrated in FIGS. 25A-25B.

Format field 2540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2542—its content distinguishes different base operations.

Register index field 2544—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2546—its content distinguishes occurrences of instructions in the generic vector instruction format that specify memory access from those that do not; that is, between no memory access 2505 instruction templates and memory access 2520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2550—its content distinguishes which one of a variety of different operations to be performed in addition to the base operation. This field is context specific. In one embodiment, this field is divided into a class field 2568, an alpha field 2552, and a beta field 2554. The augmentation operation field 2550 allows common groups of operations to be performed in a single instruction rather than 2, 3, or 4 instructions.

Scale field 2560—its content allows for the scaling of the index field's content for memory address generation (e.g., for address generation that uses $2^{scale}*\text{index}+\text{base}$).

Displacement Field 2562A—its content is used as part of memory address generation (e.g., for address generation that uses $2^{scale}*\text{index}+\text{base}+\text{displacement}$).

Displacement Factor Field 2562B (note that the juxtaposition of displacement field 2562A directly over displacement factor field 2562B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2574 (described later herein) and the data manipulation field 2554C. The displacement field 2562A and the displacement factor field 2562B are optional in the sense that they are not used for the no memory access 2505 instruction templates and/or different embodiments may implement only one or none of the two.

Data element width field 2564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2570 allows for partial vector operations, including loads, stores, arithmetic, logical, etc. While embodiments are described in which the write mask field's 2570 content selects one of a number of write mask registers that contains the write mask to be used (and thus the write mask field's 2570 content indirectly identifies that masking to be performed), alternative embodiments instead or additional allow the mask write field's 2570 content to directly specify the masking to be performed.

Immediate field 2572—its content allows for the specification of an immediate. This field is optional in the sense that is it not present in an implementation of the generic vector friendly format that does not support immediate and it is not present in instructions that do not use an immediate.

Class field 2568—its content distinguishes between different classes of instructions. With reference to FIGS. 25A-B, the contents of this field select between class A and class B instructions. In FIGS. 25A-B, rounded corner squares are used to indicate a specific value is present in a field (e.g., class A 2568A and class B 2568B for the class field 2568 respectively in FIGS. 25A-B).

Instruction Templates of Class A

In the case of the non-memory access 2505 instruction templates of class A, the alpha field 2552 is interpreted as an RS field 2552A, whose content distinguishes which one of the different augmentation operation types are to be performed (e.g., round 2552A.1 and data transform 2552A.2 are respectively specified for the no memory access, round type operation 2510 and the no memory access, data transform type operation 2515 instruction templates), while the beta field 2554 distinguishes which of the operations of the specified type is to be performed. In the no memory access 2505 instruction templates, the scale field 2560, the displacement field 2562A, and the displacement factor field 2562B are not present.

No-Memory Access Instruction Templates—Full Round Control Type Operation

In the no memory access full round control type operation 2510 instruction template, the beta field 2554 is interpreted as a round control field 2554A, whose content(s) provide static rounding. While in the described embodiments the round control field 2554A includes a suppress all floating-point exceptions (SAE) field 2556 and a round operation control field 2558, alternative embodiments may support may encode both these concepts into the same field or only have one or the other of these concepts/fields (e.g., may have only the round operation control field 2558).

SAE field 2556—its content distinguishes whether or not to disable the exception event reporting; when the SAE field's 2556 content indicates suppression is enabled, a given instruction does not report any kind of floating-point exception flag and does not raise any floating-point exception handler.

Round operation control field 2558—its content distinguishes which one of a group of rounding operations to perform (e.g., Round-up, Round-down, Round-towards-zero and Round-to-nearest). Thus, the round operation control field 2558 allows for the changing of the rounding mode on a per instruction basis. In one embodiment where a processor includes a control register for specifying rounding modes, the round operation control field's 2550 content overrides that register value.

No Memory Access Instruction Templates—Data Transform Type Operation

In the no memory access data transform type operation 2515 instruction template, the beta field 2554 is interpreted as a data transform field 2554B, whose content distinguishes which one of a number of data transforms is to be performed (e.g., no data transform, swizzle, broadcast).

In the case of a memory access 2520 instruction template of class A, the alpha field 2552 is interpreted as an eviction hint field 2552B, whose content distinguishes which one of the eviction hints is to be used (in FIG. 25A, temporal 2552B.1 and non-temporal 2552B.2 are respectively specified for the memory access, temporal 2525 instruction template and the memory access, non-temporal 2530 instruction template), while the beta field 2554 is interpreted as a data manipulation field 2554C, whose content distinguishes which one of a number of data manipulation operations (also known as primitives) is to be performed (e.g., no manipulation; broadcast; up conversion of a source; and down conversion of a destination). The memory access 2520 instruction templates include the scale field 2560, and optionally the displacement field 2562A or the displacement factor field 2562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2552 is interpreted as a write mask control (Z) field 2552C, whose content distinguishes whether the write masking controlled by the write mask field 2570 should be a merging or a zeroing.

In the case of the non-memory access 2505 instruction templates of class B, part of the beta field 2554 is interpreted as an RL field 2557A, whose content distinguishes which one of the different augmentation operation types are to be performed (e.g., round 2557A.1 and vector length (VSIZE) 2557A.2 are respectively specified for the no memory access, write mask control, partial round control type operation 2512 instruction template and the no memory access, write mask control, VSIZE type operation 2517 instruction template), while the rest of the beta field 2554 distinguishes which of the operations of the specified type is to be performed. In the no memory access 2505 instruction templates, the scale field 2560, the displacement field 2562A, and the displacement factor field 2562B are not present.

In the no memory access, write mask control, partial round control type operation 2510 instruction template, the rest of the beta field 2554 is interpreted as a round operation field 2559A and exception event reporting is disabled (a given instruction does not report any kind of floating-point exception flag and does not raise any floating-point exception handler).

Round operation control field 2559A—just as round operation control field 2558, its content distinguishes which one of a group of rounding operations to perform (e.g., Round-up, Round-down, Round-towards-zero and Round-to-nearest). Thus, the round operation control field 2559A allows for the changing of the rounding mode on a per instruction basis. In one embodiment where a processor includes a control register for specifying rounding modes, the round operation control field's 2550 content overrides that register value.

In the no memory access, write mask control, VSIZE type operation 2517 instruction template, the rest of the beta field 2554 is interpreted as a vector length field 2559B, whose content distinguishes which one of a number of data vector lengths is to be performed on (e.g., 128, 256, or 512 byte).

In the case of a memory access 2520 instruction template of class B, part of the beta field 2554 is interpreted as a broadcast field 2557B, whose content distinguishes whether or not the broadcast type data manipulation operation is to be performed, while the rest of the beta field 2554 is interpreted the vector length field 2559B. The memory access 2520 instruction templates include the scale field 2560, and optionally the displacement field 2562A or the displacement factor field 2562B.

With regard to the generic vector friendly instruction format 2500, a full opcode field 2574 is shown including the format field 2540, the base operation field 2542, and the data element width field 2564. While one embodiment is shown where the full opcode field 2574 includes all of these fields, the full opcode field 2574 includes less than all of these fields in embodiments that do not support all of them. The full opcode field 2574 provides the operation code (opcode).

The augmentation operation field 2550, the data element width field 2564, and the write mask field 2570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 26A is a block diagram illustrating an exemplary specific vector friendly instruction format according to embodiments. FIG. 26A shows a specific vector friendly instruction format 2600 that is specific in the sense that it specifies the location, size, interpretation, and order of the fields, as well as values for some of those fields. The specific vector friendly instruction format 2600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 25 into which the fields from FIG. 26A map are illustrated.

It should be understood that, although embodiments are described with reference to the specific vector friendly instruction format 2600 in the context of the generic vector friendly instruction format 2500 for illustrative purposes, the invention is not limited to the specific vector friendly instruction format 2600 except where claimed. For example, the generic vector friendly instruction format 2500 contemplates a variety of possible sizes for the various fields, while the specific vector friendly instruction format 2600 is shown as having fields of specific sizes. By way of specific example, while the data element width field 2564 is illustrated as a one-bit field in the specific vector friendly instruction format 2600, the invention is not so limited (that is, the generic vector friendly instruction format 2500 contemplates other sizes of the data element width field 2564).

The specific vector friendly instruction format 2600 includes the following fields listed below in the order illustrated in FIG. 26A.

EVEX Prefix 2602 (Bytes 0-3)—is encoded in a four-byte form.

Format Field 2540 (EVEX Byte 0, bits [7:0])—the first byte (EVEX Byte 0) is the format field 2540 and it contains 0x62 (the unique value used for distinguishing the vector friendly instruction format in one embodiment).

The second-fourth bytes (EVEX Bytes 1-3) include a number of bit fields providing specific capability.

REX field 2605 (EVEX Byte 1, bits [7-5])—consists of an EVEX.R bit field (EVEX Byte 1, bit [7]-R), EVEX.X bit field (EVEX byte 1, bit [6]-X), and EVEX.B bit field (EVEX Byte 1, bit [5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2510—this is the first part of the REX' field 2510 and is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode)

from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2615 (EVEX byte 1, bits [3:0]-mmmm)—its content encodes an implied leading opcode byte (0F, 0F 38, or 0F 3).

Data element width field 2564 (EVEX byte 2, bit [7]-W)—is represented by the notation EVEX.W. EVEX.W is used to define the granularity (size) of the datatype (either 32-bit data elements or 64-bit data elements).

EVEX.vvvv 2620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2620 encodes the 4 low-order bits of the first source register specifier stored in inverted (1s complement) form. Depending on the instruction, an extra different EVEX bit field is used to extend the specifier size to 32 registers.

EVEX.U 2568 Class field (EVEX byte 2, bit [2]-U)—If EVEX.0=0, it indicates class A or EVEX.U0; if EVEX.U=1, it indicates class B or EVEX.U1.

Prefix encoding field 2625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 2552 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 2554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 2510—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2570 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2630 (Byte 4) is also known as the opcode byte. Part of the opcode is specified in this field.

MOD R/M Field 2640 (Byte 5) includes MOD field 2642, Reg field 2644, and R/M field 2646. As previously described, the MOD field's 2642 content distinguishes between memory access and non-memory access operations. The role of Reg field 2644 can be summarized to two situations: encoding either the destination register operand or a source register operand or be treated as an opcode extension and not used to encode any instruction operand. The role of R/M field 2646 may include the following: encoding the instruction operand that references a memory address or encoding either the destination register operand or a source register operand.

Scale, Index, Base (SIB) Byte (Byte 6)—As previously described, the content of SIB 2650 is used for memory address generation. SIB.xxx 2654 and SIB.bbb 2656—the contents of these fields have been previously referred to with regard to the register indexes Xxxx and Bbbb.

Displacement field 2562A (Bytes 7-10)—when MOD field 2642 contains 10, bytes 7-10 are the displacement field 2562A, and it works the same as the legacy 32-bit displacement (disp32) and works at byte granularity.

Displacement factor field 2562B (Byte 7)—when MOD field 2642 contains 01, byte 7 is the displacement factor field 2562B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2562B is a reinterpretation of disp8; when using displacement factor field 2562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 2562B substitutes the legacy x86 instruction set 8-bit displacement. Thus, the displacement factor field 2562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2572 operates as previously described.

Full Opcode Field

FIG. 26B is a block diagram illustrating the fields of the specific vector friendly instruction format 2600 that make up the full opcode field 2574 according to one embodiment. Specifically, the full opcode field 2574 includes the format field 2540, the base operation field 2542, and the data element width (W) field 2564. The base operation field 2542 includes the prefix encoding field 2625, the opcode map field 2615, and the real opcode field 2630.

Register Index Field

FIG. 26C is a block diagram illustrating the fields of the specific vector friendly instruction format 2600 that make up the register index field 2544 according to one embodiment. Specifically, the register index field 2544 includes the REX 2605 field, the REX' 2610 field, the MODR/M.reg field 2644, the MODR/M.r/m field 2646, the VVVV field 2620, xxx field 2654, and the bbb field 2656.

as the vector length field 2559B (EVEX byte 3, bit [6-5]-$L_{1-0}$) and the broadcast field 2557B (EVEX byte 3, bit [4]-B).

Exemplary Register Architecture

FIG. 27 is a block diagram of a register architecture 2700 according to one embodiment. In the embodiment illustrated, there are 32 vector registers 2710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2600 operates on these overlaid register file as illustrated in the below tables.

| Adjustable Vector Length | Class | Operations | Registers |
|---|---|---|---|
| Instruction Templates that do not include the vector length field 2559B | A (FIG. 25A; U = 0) | 2510, 2515, 2525, 2530 | zmm registers (the vector length is 64 byte) |
| | B (FIG. 25B; U = 1) | 2512 | zmm registers (the vector length is 64 byte) |
| Instruction templates that do include the vector length field 2559B | B (FIG. 25B; U = 1) | 2517, 2527 | zmm, ymm, or xmm registers (the vector length is 64-byte, 32 byte, or 16 byte) depending on the vector length field 2559B |

Augmentation Operation Field

Figure 26D:
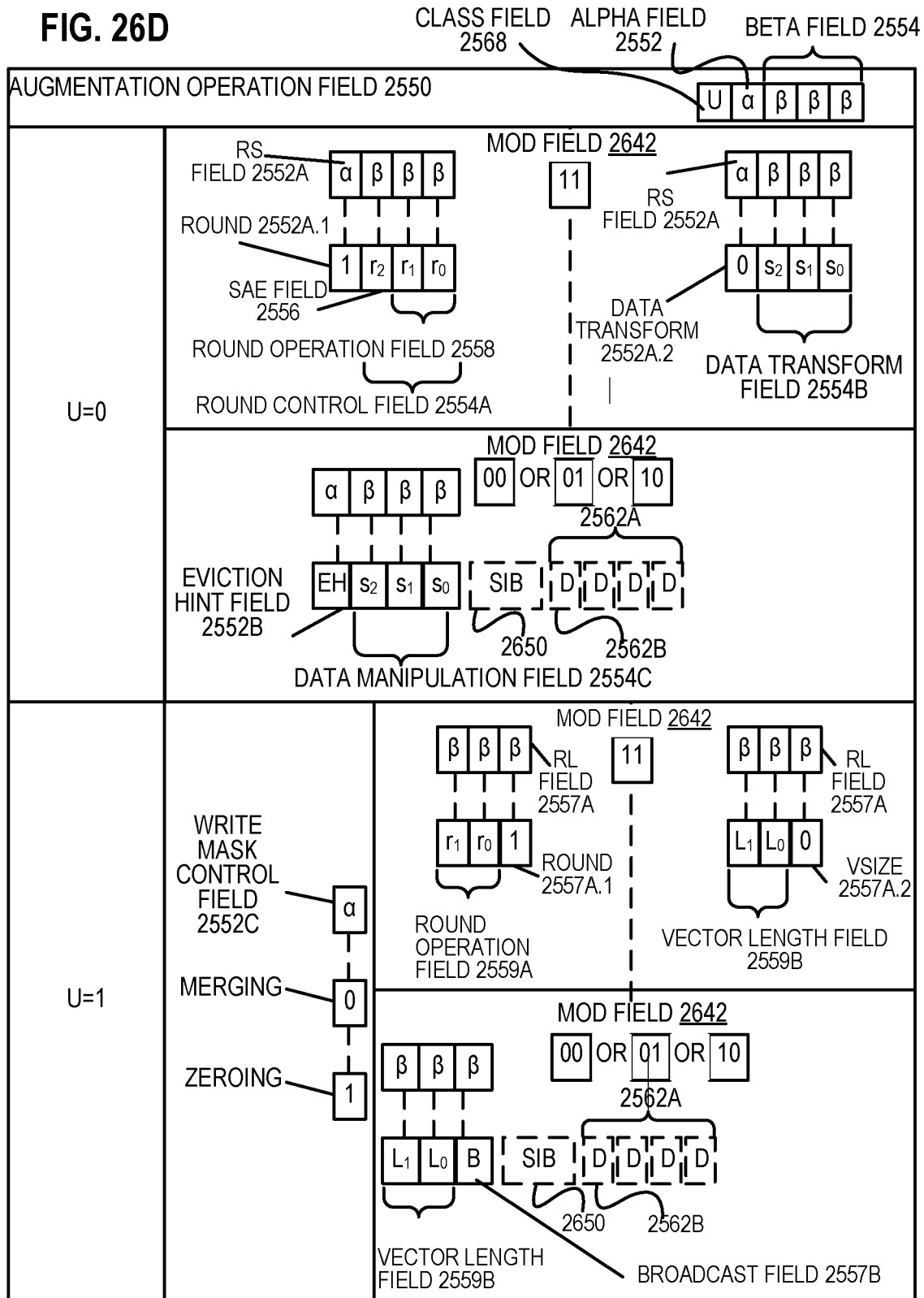
FIG. 26D is a block diagram illustrating the fields of the specific vector friendly instruction format that make up the augmentation operation field according to one embodiment.

FIG. 26D is a block diagram illustrating the fields of the specific vector friendly instruction format 2600 that make up the augmentation operation field 2550 according to one embodiment. When the class (U) field 2568 contains 0, it signifies EVEX.U0 (class A 2568A); when it contains 1, it signifies EVEX.U1 (class B 2568B). When U=0 and the MOD field 2642 contains 11 (signifying a no memory access operation), the alpha field 2552 (EVEX byte 3, bit [7]-EH) is interpreted as the rs field 2552A. When the rs field 2552A contains a 1 (round 2552A.1), the beta field 2554 (EVEX byte 3, bits [6:4]-SSS) is interpreted as the round control field 2554A. The round control field 2554A includes a one-bit SAE field 2556 and a two-bit round operation field 2558. When the rs field 2552A contains a 0 (data transform 2552A.2), the beta field 2554 (EVEX byte 3, bits [6:4]-SSS) is interpreted as a three-bit data transform field 2554B. When U=0 and the MOD field 2642 contains 00, 01, or 10 (signifying a memory access operation), the alpha field 2552 (EVEX byte 3, bit [7]-EH) is interpreted as the eviction hint (EH) field 2552B and the beta field 2554 (EVEX byte 3, bits [6:4]-SSS) is interpreted as a three bit data manipulation field 2554C.

When U=1, the alpha field 2552 (EVEX byte 3, bit [7]-EH) is interpreted as the write mask control (Z) field 2552C. When U=1 and the MOD field 2642 contains 11 (signifying a no memory access operation), part of the beta field 2554 (EVEX byte 3, bit [4]-$S_0$) is interpreted as the RL field 2557A; when it contains a 1 (round 2557A.1) the rest of the beta field 2554 (EVEX byte 3, bit [6-5]-$S_{2-1}$) is interpreted as the round operation field 2559A, while when the RL field 2557A contains a 0 (VSIZE 2557A.2) the rest of the beta field 2554 (EVEX byte 3, bit [6-5]-$S_{2-1}$) is interpreted as the vector length field 2559B (EVEX byte 3, bit [6-5]-$L_{1-0}$). When U=1 and the MOD field 2642 contains 00, 01, or 10 (signifying a memory access operation), the beta field 2554 (EVEX byte 3, bits [6:4]-SSS) is interpreted In other words, the vector length field 2559B selects between a maximum length and one or more other shorter lengths, where each such shorter length is half the length of the preceding length; and instructions templates without the vector length field 2559B operate on the maximum vector length. Further, in one embodiment, the class B instruction templates of the specific vector friendly instruction format 2600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2715—in the embodiment illustrated, there are 8 write mask registers (k0 through k7), each 64 bits in size. In an alternate embodiment, the write mask registers 2715 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 2725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2745, on which is aliased the MMX packed integer flat register file 2750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 28A is a block diagram illustrating both an exemplary in-order pipeline and an exemplary register renaming, out-of-order issue/execution pipeline according to embodiments. FIG. 28B is a block diagram illustrating both an exemplary embodiment of an in-order architecture core and an exemplary register renaming, out-of-order issue/execution architecture core to be included in a processor according to embodiments. The solid lined boxes in FIGS. 28A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 28A, a processor pipeline 2800 includes a fetch stage 2802, a length decode stage 2804, a decode stage 2806, an allocation stage 2808, a renaming stage 2810, a scheduling (also known as a dispatch or issue) stage 2812, a register read/memory read stage 2814, an execute stage 2816, a write back/memory write stage 2818, an exception handling stage 2822, and a commit stage 2824.

FIG. 28B shows processor core 2890 including a front-end unit 2830 coupled to an execution engine unit 2850, and both are coupled to a memory unit 2870. The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like.

The front-end unit 2830 includes a branch prediction unit 2832 coupled to an instruction cache unit 2834, which is coupled to an instruction translation lookaside buffer (TLB) 2836, which is coupled to an instruction fetch unit 2838, which is coupled to a decode unit 2840. The decode unit 2840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM or other medium that stores microcode for certain macroinstructions (e.g., in decode unit 2840 or otherwise within the front-end unit 2830). The decode unit 2840 is coupled to a rename/allocator unit 2852 in the execution engine unit 2850.

The execution engine unit 2850 includes the rename/allocator unit 2852 coupled to a retirement unit 2854 and a set of one or more scheduler unit(s) 2856. The scheduler unit(s) 2856 represents any number of different schedulers, including reservations stations, central instruction window, etc. The scheduler unit(s) 2856 is coupled to the physical register file(s) unit(s) 2858. Each of the physical register file(s) units 2858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2858 comprises a vector registers unit, a write mask registers unit, and a scalar registers unit. These register units may provide architectural vector registers, vector mask registers, and general-purpose registers. The physical register file(s) unit(s) 2858 is overlapped by the retirement unit 2854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2854 and the physical register file(s) unit(s) 2858 are coupled to the execution cluster(s) 2860. The execution cluster(s) 2860 includes a set of one or more execution units 2862 and a set of one or more memory access units 2864. The execution units 2862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2856, physical register file(s) unit(s) 2858, and execution cluster(s) 2860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2864). It should also be understood that where separate pipelines are used, one or more of these pipelines may be out-of-order issue/execution and the rest in-order.

The set of memory access units 2864 is coupled to the memory unit 2870, which includes a data TLB unit 2872 coupled to a data cache unit 2874 coupled to a level 2 (L2) cache unit 2876. In one exemplary embodiment, the memory access units 2864 may include a load unit, a store address unit, and a store data unit, each of which is coupled to the data TLB unit 2872 in the memory unit 2870. The instruction cache unit 2834 is further coupled to a level 2 (L2) cache unit 2876 in the memory unit 2870. The L2 cache unit 2876 is coupled to one or more other levels of cache and eventually to a main memory.

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit 2840 performs the decode stage 2806; 3) the rename/allocator unit 2852 performs the allocation stage 2808 and renaming stage 2810; 4) the scheduler unit(s) 2856 performs the schedule stage 2812; 5) the physical register file(s) unit(s) 2858 and the memory unit 2870 perform the register read/memory read stage 2814; the execution cluster 2860 perform the execute stage 2816; 6) the memory unit 2870 and the physical register file(s) unit(s) 2858 perform the write back/memory write stage 2818; 7) various units may be involved in the exception handling stage 2822; and 8) the retirement unit 2854 and the physical register file(s) unit(s) 2858 perform the commit stage 2824.

The core 2890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2834/2874 and a shared L2 cache unit 2876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 29A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 29A is a block diagram of a single processor core, along with its connection to the on-die interconnect network 2902 and with its local subset of the Level 2 (L2) cache 2904, according to embodiments. In one embodiment, an instruction decoder 2900 supports the x86 instruction set with a packed data instruction set extension. An L1 cache 2906 allows low-latency accesses to cache memory into the scalar and vector units. While in one embodiment (to simplify the design), a scalar unit 2908 and a vector unit 2910 use separate register sets (respectively, scalar registers 2912 and vector registers 2914) and data transferred between them is written to memory and then read back in from a level 1 (L1) cache 2906, alternative embodiments may use a different approach (e.g., use a single register set or include a communication path that allow data to be transferred between the two register files without being written and read back).

The local subset of the L2 cache 2904 is part of a global L2 cache that is divided into separate local subsets, one per processor core. Each processor core has a direct access path to its own local subset of the L2 cache 2904. Data read by a processor core is stored in its L2 cache subset 2904 and can be accessed quickly, in parallel with other processor cores accessing their own local L2 cache subsets. Data written by a processor core is stored in its own L2 cache subset 2904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 29B is an expanded view of part of the processor core in FIG. 29A according to embodiments. FIG. 29B includes an L1 data cache 2906A part of the L1 cache 2904, as well as more detail regarding the vector unit 2910 and the vector registers 2914. Specifically, the vector unit 2910 is a 16-wide vector processing unit (VPU) (see the 16-wide ALU 2928), which executes one or more of integer, single-precision float, and double-precision float instructions. The VPU supports swizzling the register inputs with swizzle unit 2920, numeric conversion with numeric convert units 2922A-B, and replication with replication unit 2924 on the memory input. Write mask registers 2926 allow predicating resulting vector writes.

Figure 30:
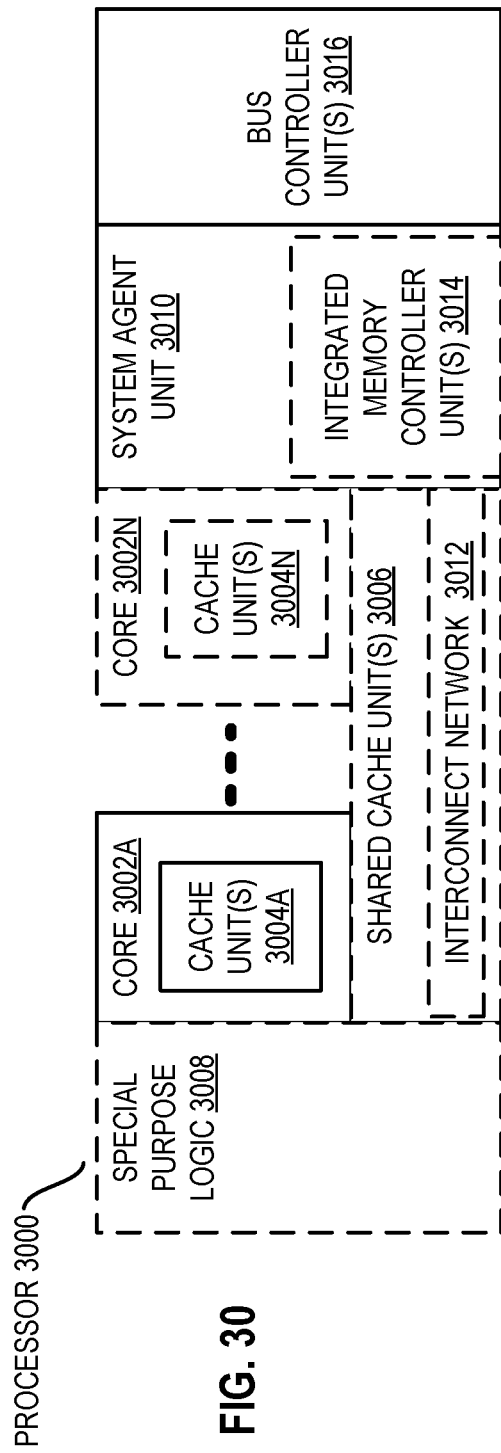
FIG. 30 is a block diagram of a processor that may have more than one core, may have an integrated memory controller, and may have integrated graphics according to embodiments.

FIG. 30 is a block diagram of a processor 3000 that may have more than one core, may have an integrated memory controller, and may have integrated graphics according to embodiments. The solid lined boxes in FIG. 30 illustrate a processor 3000 with a single core 3002A, a system agent 3010, a set of one or more bus controller units 3016, while the optional addition of the dashed lined boxes illustrates an alternative processor 3000 with multiple cores 3002A-N, a set of one or more integrated memory controller unit(s) 3014 in the system agent unit 3010, and special purpose logic 3008.

Thus, different implementations of the processor 3000 may include: 1) a CPU with the special purpose logic 3008 being integrated graphics and/or scientific (throughput) logic (which may include one or more cores), and the cores 3002A-N being one or more general purpose cores (e.g., general purpose in-order cores, general purpose out-of-order cores, a combination of the two); 2) a coprocessor with the cores 3002A-N being a large number of special purpose cores intended primarily for graphics and/or scientific (throughput); and 3) a coprocessor with the cores 3002A-N being a large number of general purpose in-order cores. Thus, the processor 3000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3006, and external memory (not shown) coupled to the set of integrated memory controller units 3014. The set of shared cache units 3006 may include one or more mid-level caches, such as level 2 (L2), level 3 (L3), level 4 (L4), or other levels of cache, a last level cache (LLC), and/or combinations thereof. While in one embodiment a ring based interconnect unit 3012 interconnects the special purpose logic 3008 (integrated graphics logic is an example of and is also referred to herein as special purpose logic), the set of shared cache units 3006, and the system agent unit 3010/integrated memory controller unit(s) 3014, alternative embodiments may use any number of well-known techniques for interconnecting such units. In one embodiment, coherency is maintained between one or more cache units 3006 and cores 3002A-N.

In some embodiments, one or more of the cores 3002A-N are capable of multithreading. The system agent 3010 includes those components coordinating and operating cores 3002A-N. The system agent unit 3010 may include for example a power control unit (PCU) and a display unit. The PCU may be or include logic and components needed for regulating the power state of the cores 3002A-N and the special purpose logic 3008. The display unit is for driving one or more externally connected displays.

The cores 3002A-N may be homogenous or heterogeneous in terms of architecture instruction set; that is, two or more of the cores 3002A-N may be capable of execution the same instruction set, while others may be capable of executing only a subset of that instruction set or a different instruction set.

Exemplary Computer Architectures

FIGS. 31-34 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 31:
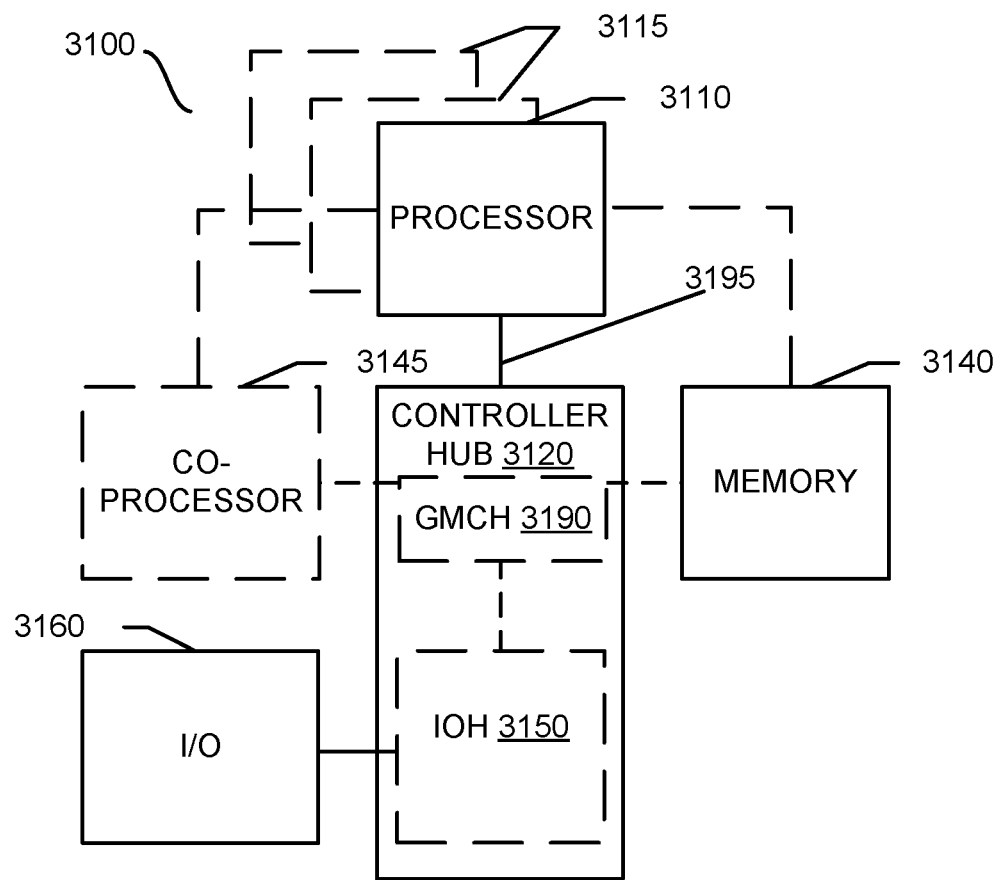
FIGS. 31-34 are block diagrams of exemplary computer architectures.

Referring now to FIG. 31, shown is a block diagram of a system 3100 in accordance with one embodiment of the present invention. The system 3100 may include one or more processors 3110, 3115, which are coupled to a controller hub 3120. In one embodiment the controller hub 3120 includes a graphics memory controller hub (GMCH) 3190 and an Input/Output Hub (IOH) 3150 (which may be on separate chips); the GMCH 3190 includes memory and graphics controllers to which are coupled memory 3140 and a coprocessor 3145; the IOH 3150 couples input/output (I/O) devices 3160 to the GMCH 3190. Alternatively, one or both of the memory and graphics controllers are integrated within the processor (as described herein), the memory 3140 and the coprocessor 3145 are coupled directly to the processor 3110, and the controller hub 3120 in a single chip with the IOH 3150.

The optional nature of additional processors 3115 is denoted in FIG. 31 with broken lines. Each processor 3110, 3115 may include one or more of the processing cores described herein and may be some version of the processor 3000.

The memory 3140 may be, for example, dynamic random-access memory (DRAM), phase change memory (PCM), or a combination of the two. For at least one embodiment, the controller hub 3120 communicates with the processor(s) 3110, 3115 via a multi-drop bus, such as a frontside bus (FSB), point-to-point interface such as Quick-Path Interconnect (QPI), or similar connection 3195.

In one embodiment, the coprocessor 3145 is a special-purpose processor, such as, for example, a high-throughput MIC processor, a network or communication processor, compression engine, graphics processor, GPGPU, embedded processor, or the like. In one embodiment, controller hub 3120 may include an integrated graphics accelerator.

There can be a variety of differences between the physical resources 3110, 3115 in terms of a spectrum of metrics of merit including architectural, microarchitectural, thermal, power consumption characteristics, and the like.

In one embodiment, the processor 3110 executes instructions that control data processing operations of a general type. Embedded within the instructions may be coprocessor instructions. The processor 3110 recognizes these coprocessor instructions as being of a type that should be executed by the attached coprocessor 3145. Accordingly, the processor 3110 issues these coprocessor instructions (or control signals representing coprocessor instructions) on a coprocessor bus or other interconnect, to coprocessor 3145. Coprocessor(s) 3145 accept and execute the received coprocessor instructions.

Figure 32:
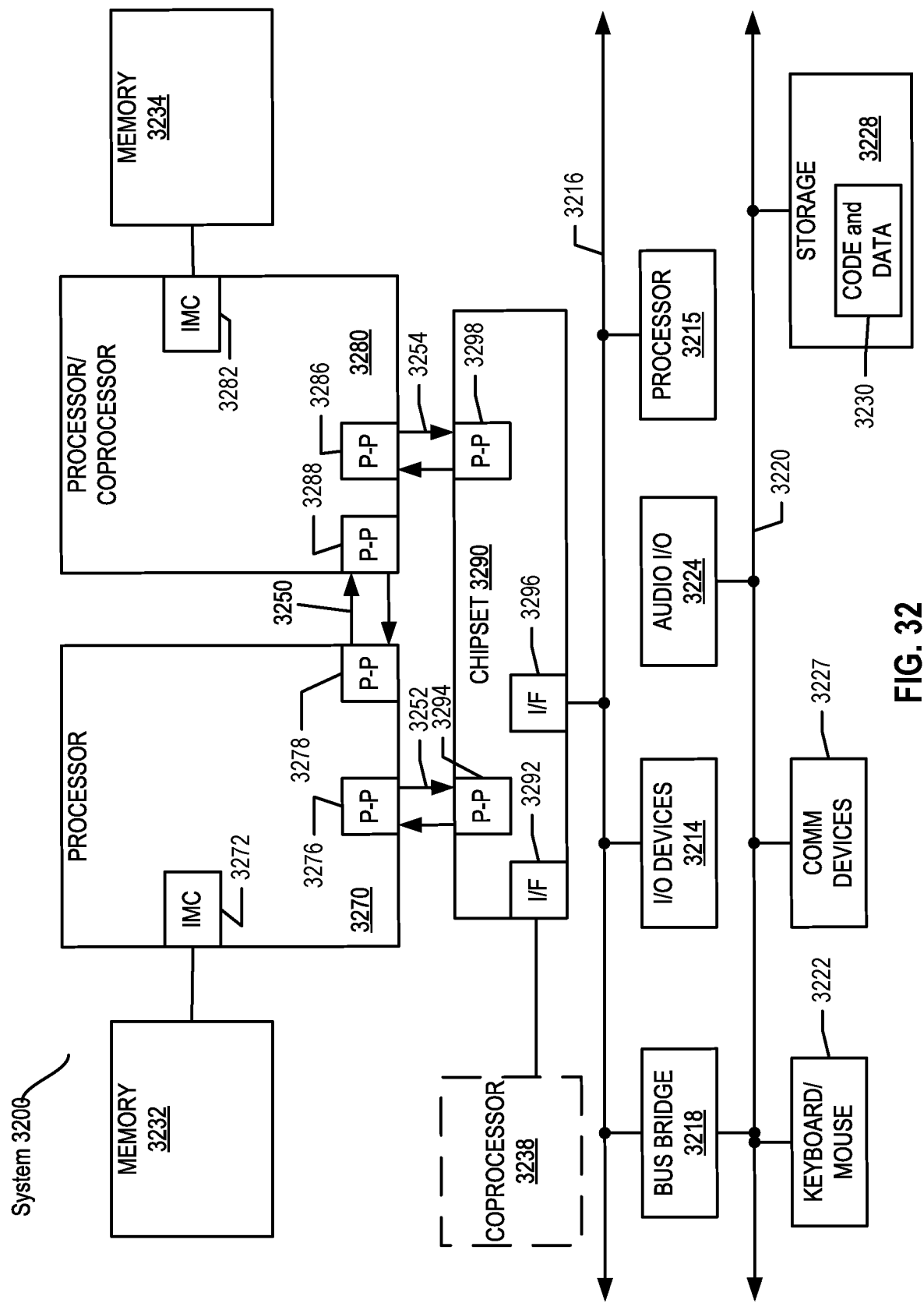

Referring now to FIG. 32, shown is a block diagram of a first more specific exemplary system 3200 in accordance with an embodiment of the present invention. As shown in FIG. 32, multiprocessor system 3200 is a point-to-point interconnect system, and includes a first processor 3270 and a second processor 3280 coupled via a point-to-point interconnect 3250. Each of processors 3270 and 3280 may be some version of the processor 3000. In one embodiment, processors 3270 and 3280 are respectively processors 3110 and 3115, while coprocessor 3238 is coprocessor 3145. In another embodiment, processors 3270 and 3280 are respectively processor 3110 coprocessor 3145.

Processors 3270 and 3280 are shown including integrated memory controller (IMC) units 3272 and 3282, respectively. Processor 3270 also includes as part of its bus controller units point-to-point (P-P) interfaces 3276 and 3278; similarly, second processor 3280 includes P-P interfaces 3286 and 3288. Processors 3270, 3280 may exchange information via a point-to-point (P-P) interface 3250 using P-P interface circuits 3278, 3288. As shown in FIG. 32, IMCs 3272 and 3282 couple the processors to respective memories, namely a memory 3232 and a memory 3234, which may be portions of main memory locally attached to the respective processors.

Processors 3270, 3280 may each exchange information with a chipset 3290 via individual P-P interfaces 3252, 3254 using point to point interface circuits 3276, 3294, 3286, 3298. Chipset 3290 may optionally exchange information with the coprocessor 3238 via a high-performance interface 3292. In one embodiment, the coprocessor 3238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 3290 may be coupled to a first bus 3216 via an interface 3296. In one embodiment, first bus 3216 may be a Peripheral Component Interconnect (PCI) bus, or a bus such as a PCI Express bus or another third generation I/O interconnect bus, although the scope of the present invention is not so limited.

As shown in FIG. 32, various I/O devices 3214 may be coupled to first bus 3216, along with a bus bridge 3218 which couples first bus 3216 to a second bus 3220. In one embodiment, one or more additional processor(s) 3215, such as coprocessors, high-throughput MIC processors, GPGPU's, accelerators (such as, e.g., graphics accelerators or digital signal processing (DSP) units), field programmable gate arrays, or any other processor, are coupled to first bus 3216. In one embodiment, second bus 3220 may be a low pin count (LPC) bus. Various devices may be coupled to a second bus 3220 including, for example, a keyboard and/or mouse 3222, communication devices 3227 and a storage unit 3228 such as a disk drive or other mass storage device which may include instructions/code and data 3230, in one embodiment. Further, an audio I/O 3224 may be coupled to the second bus 3220. Note that other architectures are possible. For example, instead of the point-to-point architecture of FIG. 32, a system may implement a multi-drop bus or other such architecture.

Figure 33:
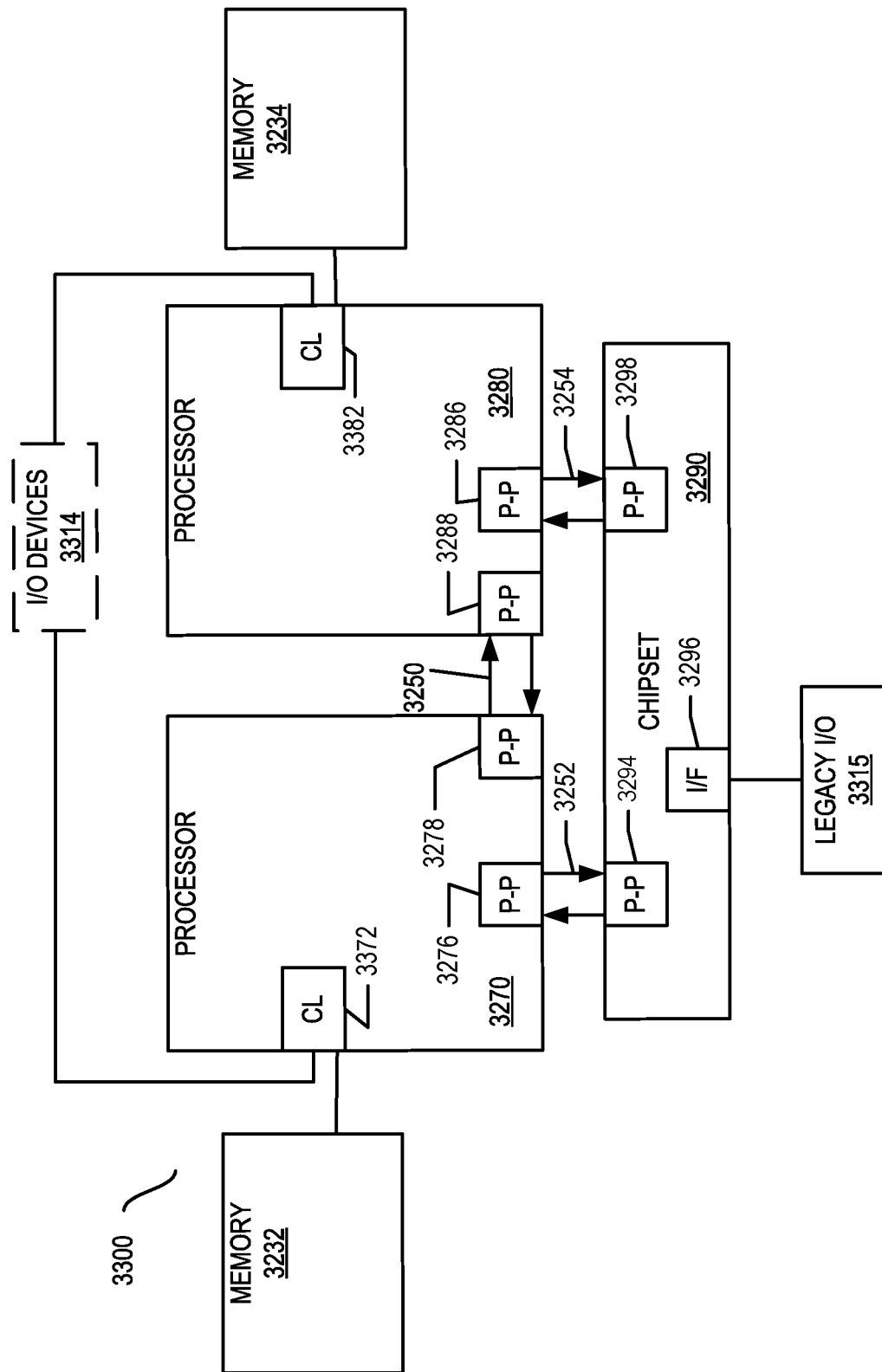

Referring now to FIG. 33, shown is a block diagram of a second more specific exemplary system 3300 in accordance with an embodiment of the present invention. Like elements in FIGS. 32 and 33 bear like reference numerals, and certain aspects of FIG. 32 have been omitted from FIG. 33 in order to avoid obscuring other aspects of FIG. 33.

FIG. 33 illustrates that the processors 3270, 3280 may include integrated memory and I/O control logic ("CL") 3372 and 3382, respectively. Thus, the CL 3372, 3382 include integrated memory controller units and include I/O control logic. FIG. 33 illustrates that not only are the memories 3232, 3234 coupled to the CL 3372, 3382, but also that I/O devices 3314 are also coupled to the control logic 3372, 3382. Legacy I/O devices 3315 are coupled to the chipset 3290.

Figure 34:
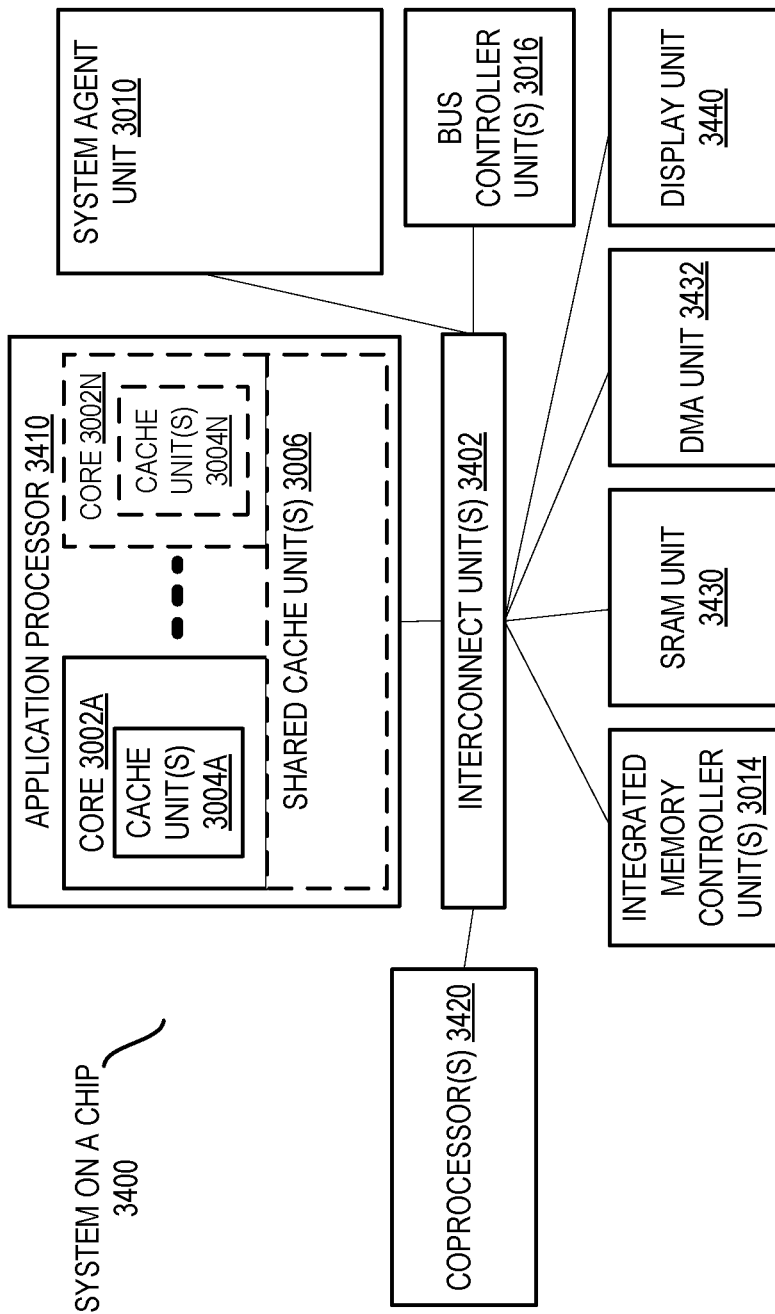

Referring now to FIG. 34, shown is a block diagram of a SoC 3400 in accordance with an embodiment of the present invention. Similar elements in FIG. 30 bear like reference numerals. Also, dashed lined boxes are optional features on more advanced SoCs. In FIG. 34, an interconnect unit(s) 3402 is coupled to: an application processor 3410 which includes a set of one or more cores 3002A-N, which include cache units 3004A-N, and shared cache unit(s) 3006; a system agent unit 3010; a bus controller unit(s) 3016; an integrated memory controller unit(s) 3014; a set or one or more coprocessors 3420 which may include integrated graphics logic, an image processor, an audio processor, and a video processor; an static random access memory (SRAM) unit 3430; a direct memory access (DMA) unit 3432; and a display unit 3440 for coupling to one or more external displays. In one embodiment, the coprocessor(s) 3420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 3230 illustrated in FIG. 32, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 35:
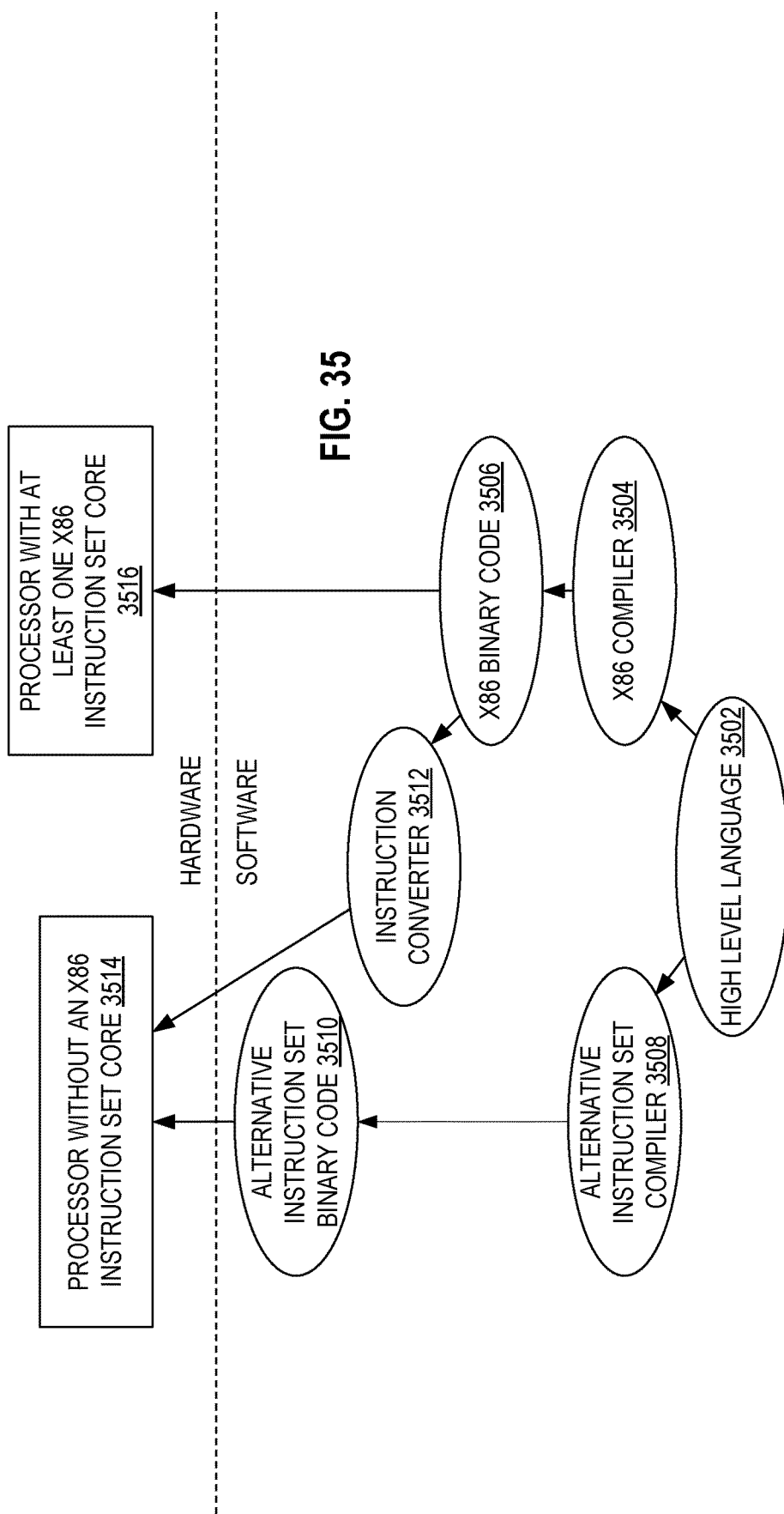
FIG. 35 is a block diagram contrasting the use of a software instruction converter to convert binary instructions in a source instruction set to binary instructions in a target instruction set according to embodiments.

FIG. 35 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 35 shows a program in a high-level language 3502 may be compiled using an x86 compiler 3504 to generate x86 binary code 3506 that may be natively executed by a processor with at least one x86 instruction set core 3516. The processor with at least one x86 instruction set core 3516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3504 represents a compiler that is operable to generate x86 binary code 3506 (e.g., object code) that can, with or without additional linkage processing, be executed on the processor with at least one x86 instruction set core 3516. Similarly, FIG. 35 shows the program in the high level language 3502 may be compiled using an alternative instruction set compiler 3508 to generate alternative instruction set binary code 3510 that may be natively executed by a processor without at least one x86 instruction set core 3514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3512 is used to convert the x86 binary code 3506 into code that may be natively executed by the processor without an x86 instruction set core 3514. This converted code is not likely to be the same as the alternative instruction set binary code 3510 because an instruction converter capable of this is difficult to make; however, the converted code will accomplish the general operation and be made up of instructions from the alternative instruction set. Thus, the instruction converter 3512 represents software, firmware, hardware, or a combination thereof that, through emulation, simulation or any other process, allows a processor or other electronic device that does not have an x86 instruction set processor or core to execute the x86 binary code 3506.

Further Examples

Example 1 provides an exemplary processor including: decode circuitry to decode an instruction specifying locations of first and second floating-point (FP) sources, and an opcode indicating the processor is to: shift a mantissa of the smaller source FP operand to the right until the FP sources are aligned, generating rounding controls based on any bits that escape, simultaneously generate two sums: one of the FP sources and the other of the FP sources plus one, the sums having a fuzzy-Jbit format with an additional possible Jbit position; select one of the two sums based on the rounding controls, and generate a result including a mantissa-wide number of most-significant bits of the selected sum, staring with the most significant non-zero Jbit, and execution circuitry to execute the instruction as per the opcode.

Example 2 includes the substance of the exemplary processor of Example 1, wherein the instruction is further to specify locations of a third and a fourth source FP operands, and the opcode further indicates the execution circuitry, in a first cycle, is to generate a product of the third and fourth source FP operands, the product to be used in a second cycle by serving as a first source FP format to be used in generating the result.

Example 3 includes the substance of the exemplary processor of Example 2, wherein the first, second, and third FP operands include packed-data vectors having multiple floating-point elements, and wherein the execution circuitry is to execute the decoded instruction on each of the multiple elements in parallel.

Example 4 includes the substance of the exemplary processor of Example 2, wherein the first, second, and third FP operands include matrices having M rows by N columns of floating-point elements, and wherein the execution circuitry is to execute the decoded instruction on a subset of the M×N elements in parallel.

Example 5 includes the substance of the exemplary processor of Example 1, wherein the first and second FP operands have different signs.

Example 6 includes the substance of the exemplary processor of Example 1, wherein the fuzzy-Jbit format, consistent with a standard format promulgated by the Institute of Electronics and Electrical Engineers (IEEE-754), includes a 23-bit fraction and 9-bit exponent, but, unlike the IEEE 754 standard, which defines bit 23 as a location of the Jbit, the fuzzy-Jbit format has multiple possible locations for the Jbit.

Example 7 includes the substance of the exemplary processor of Example 1, wherein the accumulation result, maintaining its fuzzy-Jbit format, is routed for use by a subsequent floating-point operation.

Example 8 includes the substance of the exemplary processor of Example 1, wherein the execution circuitry is to convert the result into standard IEEE 754 format and write the converted result into a destination operand further specified by the instruction.

Example 9 provides an exemplary method to be performed by a processor, the method including: decoding, using decode circuitry, an instruction specifying locations of first and second floating-point (FP) sources, and an opcode indicating the processor is to: shift a mantissa of the smaller source FP operand to the right until the FP sources are aligned, generating rounding controls based on any bits that escape, simultaneously generate two sums: one of the FP sources and the other of the FP sources plus one, the sums having a fuzzy-Jbit format with an additional possible Jbit position; select one of the two sums based on the rounding controls, and generate a result including a mantissa-wide number of most-significant bits of the selected sum, starting with the most significant non-zero Jbit, and executing, using execution circuitry, the instruction as per the opcode.

Example 10 includes the substance of the exemplary method of Example 9, wherein the instruction is further to specify locations of a third and a fourth source FP operands, and the opcode further indicates the execution circuitry, in a first cycle, is to generate a product of the third and fourth source FP operands, the product to be used in a second cycle by serving as a first source FP format to be used in generating the result.

Example 11 includes the substance of the exemplary method of Example 10, wherein the first, second, and third FP operands include packed-data vectors having multiple floating-point elements, and wherein the execution circuitry is to execute the decoded instruction on each of the multiple elements in parallel.

Example 12 includes the substance of the exemplary method of Example 10, wherein the first, second, and third FP operands include matrices having M rows by N columns of floating-point elements, and wherein the execution circuitry is to execute the decoded instruction on a subset of the M×N elements in parallel.

Example 13 includes the substance of the exemplary method of Example 9, wherein the first and second FP operands have different signs.

Example 14 includes the substance of the exemplary method of Example 9, wherein the fuzzy-Jbit format, consistent with a standard format promulgated by the Institute of Electronics and Electrical Engineers (IEEE-754), includes a 23-bit fraction and 9-bit exponent, but, unlike the IEEE 754 standard, which defines bit 23 as a location of the Jbit, the fuzzy-Jbit format has multiple possible locations for the Jbit.

Example 15 includes the substance of the exemplary method of Example 9, wherein the result, maintaining its fuzzy-Jbit format, is routed for use by a subsequent floating-point operation.

Example 16 includes the substance of the exemplary method of Example 9, wherein the execution circuitry is to convert the result into standard IEEE 754 format and write the converted result into a destination operand further specified by the instruction.

Example 17 provides an exemplary non-transitory machine readable medium containing instructions to which a processor is to respond by: decoding, using decode circuitry, an instruction specifying locations of first and second floating-point (FP) sources, and an opcode indicating the processor is to: shift a mantissa of the smaller source FP operand to the right until the FP sources are aligned, generating rounding controls based on any bits that escape, simultaneously generate two sums: one of the FP sources and the other of the FP sources plus one, the sums having a fuzzy-Jbit format with an additional possible Jbit position; select one of the two sums based on the rounding controls, and generate a result including a mantissa-wide number of most-significant bits of the selected sum, starting with the most significant non-zero Jbit, and executing, using execution circuitry, the instruction as per the opcode.

Example 18 includes the substance of the exemplary non-transitory machine readable medium of Example 17, wherein the instruction is further to specify locations of a third and a fourth source FP operands, and the opcode further indicates the execution circuitry, in a first cycle, is to generate a product of the third and fourth source FP operands, the product to be used in a second cycle by serving as a first source FP format to be used in generating the result.

Example 19 includes the substance of the exemplary non-transitory machine readable medium of Example 17, wherein the first and second FP operands have different signs.

Example 20 includes the substance of the exemplary non-transitory machine readable medium of Example 17, wherein the fuzzy-Jbit format, consistent with a standard format promulgated by the Institute of Electronics and Electrical Engineers (IEEE-754), includes a 23-bit fraction and 9-bit exponent, but, unlike the IEEE 754 standard, which defines bit 23 as a location of the Jbit, the fuzzy-Jbit format has multiple possible locations for the Jbit.

What is claimed is:

1. A processor comprising:
   decode circuitry to decode an instruction specifying locations of first and second floating-point (FP) sources, and an opcode indicating execution circuitry is to:
   shift a mantissa of the smaller source FP operand to the right until the FP sources are aligned, generating rounding controls based on any bits that escape,
   generate four sums comprising a first sum of the FP sources on a first range, a second sum of the FP sources plus one on the first range, a third sum of the FP sources on a second different range, and a fourth sum of the FP sources plus one on the second different range, the sums having a fuzzy-Jbit format with an additional possible Jbit position,
   select one of the four sums based on the rounding controls, and
   generate a result comprising a mantissa-wide number of most-significant bits of the selected sum, starting with the most significant non-zero Jbit; and
   the execution circuitry to execute the instruction as per the opcode.

2. The processor of claim 1, wherein the instruction is further to specify locations of a third and a fourth source FP operand, and the opcode further indicates the execution circuitry, in a first cycle, is to generate a product of the third and fourth source FP operands, the product to be used in a second cycle by serving as a first source FP format to be used in generating the result.

3. The processor of claim 2, wherein the first, second, and third FP operands comprise packed-data vectors having multiple floating-point elements, and wherein the execution circuitry is to execute the decoded instruction on each of the multiple elements in parallel.

4. The processor of claim 2, wherein the first, second, and third FP operands comprise matrices having M rows by N columns of floating-point elements, and wherein the execution circuitry is to execute the decoded instruction on a subset of the M×N elements in parallel.

5. The processor of claim 1, wherein the first and second FP operands have different signs.

6. The processor of claim 1, wherein the fuzzy-Jbit format, consistent with a standard format promulgated by the Institute of Electronics and Electrical Engineers (IEEE-754), comprises a 23-bit fraction and 9-bit exponent, but, unlike the IEEE 754 standard, which defines bit 23 as a location of the Jbit, the fuzzy-Jbit format has multiple possible locations for the Jbit.

7. The processor of claim 1, wherein the result, maintaining its fuzzy-Jbit format, is routed for use by a subsequent floating-point operation.

8. The processor of claim 1, wherein the execution circuitry is to convert the result into standard IEEE 754 format and write the converted result into a destination operand further specified by the instruction.

9. A method to be performed by a processor, the method comprising:
   decoding, using decode circuitry, an instruction specifying locations of first and second floating-point (FP) sources, and an opcode indicating execution circuitry is to:

shift a mantissa of the smaller source FP operand to the right until the FP sources are aligned, generating rounding controls based on any bits that escape, generate four sums comprising a first sum of the FP sources on a first range, a second sum of the FP sources plus one on the first range, a third sum of the FP sources on a second different range, and a fourth sum of the FP sources plus one on the second different range, the sums having a fuzzy-Jbit format with an additional possible Jbit position, select one of the four sums based on the rounding controls, and generate a result comprising a mantissa-wide number of most-significant bits of the selected sum, starting with the most significant non-zero Jbit; and executing, using the execution circuitry, the instruction as per the opcode.

10. The method of claim 9, wherein the instruction is further to specify locations of a third and a fourth source FP operands, and the opcode further indicates the execution circuitry, in a first cycle, is to generate a product of the third and fourth source FP operands, the product to be used in a second cycle by serving as a first source FP format to be used in generating the result.

11. The method of claim 10, wherein the first, second, and third FP operands comprise packed-data vectors having multiple floating-point elements, and wherein the execution circuitry is to execute the decoded instruction on each of the multiple elements in parallel.

12. The method of claim 10, wherein the first, second, and third FP operands comprise matrices having M rows by N columns of floating-point elements, and wherein the execution circuitry is to execute the decoded instruction on a subset of the M×N elements in parallel.

13. The method of claim 9, wherein the first and second FP operands have different signs.

14. The method of claim 9, wherein the fuzzy-Jbit format, consistent with a standard format promulgated by the Institute of Electronics and Electrical Engineers (IEEE-754), comprises a 23-bit fraction and 9-bit exponent, but, unlike the IEEE 754 standard, which defines bit 23 as a location of the Jbit, the fuzzy-Jbit format has multiple possible locations for the Jbit.

15. The method of claim 9, wherein the result, maintaining its fuzzy-Jbit format, is routed for use by a subsequent floating-point operation.

16. The method of claim 9, wherein the execution circuitry is to convert the result into standard IEEE 754 format and write the converted result into a destination operand further specified by the instruction.

17. A non-transitory machine readable medium containing code to which a processor is to respond by:

decoding, using decode circuitry, an instruction specifying locations of first and second floating-point (FP) sources, and an opcode indicating execution circuitry is to:

shift a mantissa of the smaller source FP operand to the right until the FP sources are aligned, generating rounding controls based on any bits that escape, generate four sums comprising a first sum of the FP sources on a first range, a second sum of the FP sources plus one on the first range, a third sum of the FP sources on a second different range, and a fourth sum of the FP sources plus one on the second different range, the sums having a fuzzy-Jbit format with an additional possible Jbit position;

select one of the four sums based on the rounding controls, and generate a result comprising a mantissa-wide number of most-significant bits of the selected sum, starting with the most significant non-zero Jbit; and executing, using the execution circuitry, the instruction as per the opcode.

18. The non-transitory machine readable medium of claim 17, wherein the instruction is further to specify locations of a third and a fourth source FP operand, and the opcode further indicates the execution circuitry, in a first cycle, is to generate a product of the third and fourth source FP operands, the product to be used in a second cycle by serving as a first source FP format to be used in generating the result.

19. The non-transitory machine readable medium of claim 17, wherein the first and second FP operands have different signs.

20. The non-transitory machine readable medium of claim 17, wherein the fuzzy-Jbit format, consistent with a standard format promulgated by the Institute of Electronics and Electrical Engineers (IEEE-754), comprises a 23-bit fraction and 9-bit exponent, but, unlike the IEEE 754 standard, which defines bit 23 as a location of the Jbit, the fuzzy-Jbit format has multiple possible locations for the Jbit.

* * * * *